(12) United States Patent
Chen et al.

(10) Patent No.: US 11,002,942 B2
(45) Date of Patent: May 11, 2021

(54) OPTICAL IMAGING LENS

(71) Applicant: GENIUS ELECTRONIC OPTICAL (XIAMEN) CO., LTD., Fujian (CN)

(72) Inventors: Yu-Ming Chen, Taichung (TW); Pei-Chi Wang, Taichung (TW); Sheng-Wei Hsu, Taichung (TW)

(73) Assignee: GENIUS ELECTRONICS OPTICAL CO., LTD., Taichung (TW)

( * ) Notice: Subject to any disclaimer, the term of this patent is extended or adjusted under 35 U.S.C. 154(b) by 203 days.

(21) Appl. No.: 15/955,713

(22) Filed: Apr. 18, 2018

(65) Prior Publication Data
US 2019/0219795 A1    Jul. 18, 2019

(30) Foreign Application Priority Data
Jan. 15, 2018    (CN) .......................... 201810036952.7

(51) Int. Cl.
| G02B 9/62 | (2006.01) |
| G02B 27/00 | (2006.01) |
| G02B 3/00 | (2006.01) |
| G02B 13/00 | (2006.01) |
| G02B 13/04 | (2006.01) |
| G02B 3/04 | (2006.01) |

(52) U.S. Cl.
CPC ............. G02B 9/62 (2013.01); G02B 3/0087 (2013.01); G02B 3/04 (2013.01); G02B 13/0045 (2013.01); G02B 13/04 (2013.01); G02B 27/0037 (2013.01)

(58) Field of Classification Search
CPC .... G02B 9/62; G02B 3/0087; G02B 27/0037; G02B 13/0045; G02B 3/04
See application file for complete search history.

(56) References Cited

U.S. PATENT DOCUMENTS

2018/0259746 A1*    9/2018    Fukaya .................... G02B 9/62

\* cited by examiner

*Primary Examiner* — Jack Dinh
(74) *Attorney, Agent, or Firm* — JCIPRNET

(57) ABSTRACT

An optical imaging lens including a first, a second, a third, a fourth, a fifth, and a sixth lens elements arranged in sequence from an object side to an image side. Each of the lens elements includes an object-side surface and an image-side surface. The first to sixth lens elements have refracting power. The second lens element has a negative refracting power. An optical axis region of the image-side surface of the third lens element is concave. There is no air gap between the fourth lens element and the fifth lens element. A ratio between a distance on an optical axis from the image-side surface of the first lens element to the object-side surface of the fourth lens element and a thickness of the first lens element along the optical axis is less than or equal to 3.000.

20 Claims, 36 Drawing Sheets

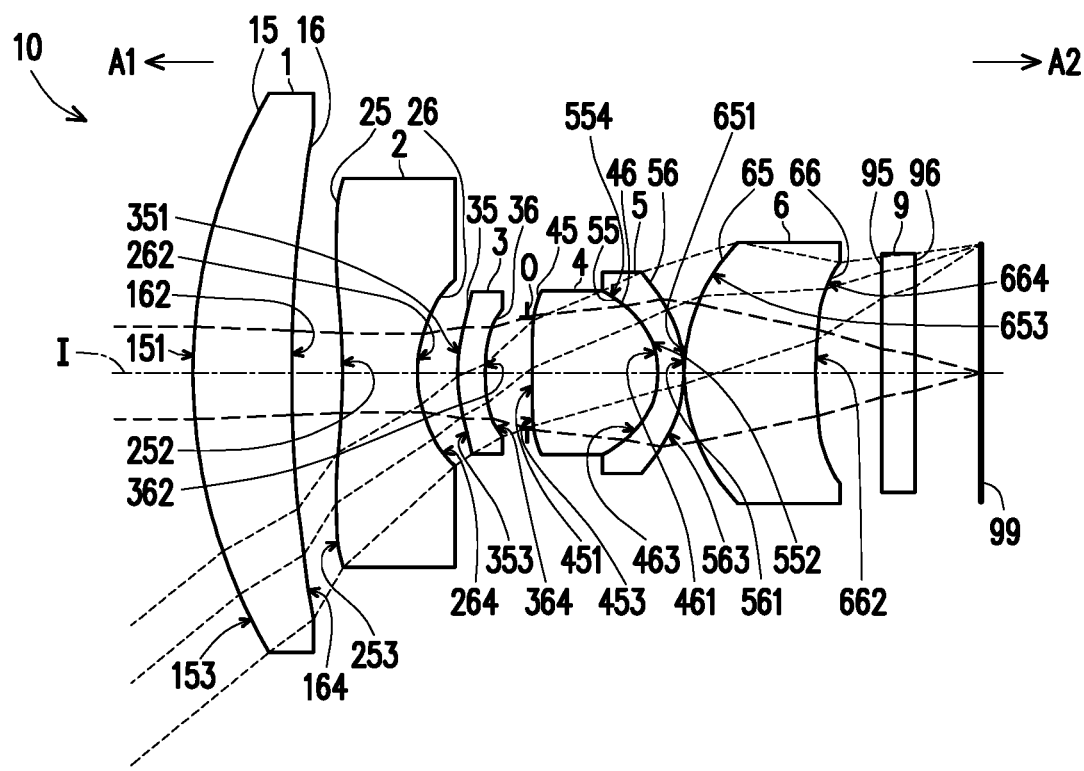
FIG. 6
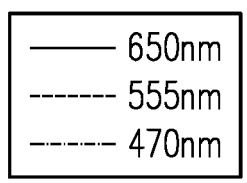
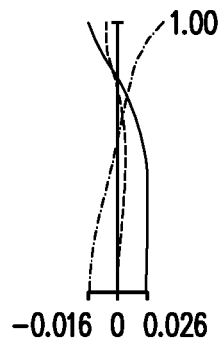
Longitudinal spherical aberration
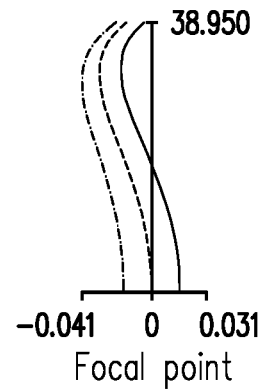
Field curvature (sagittal direction) Half field of view (°)
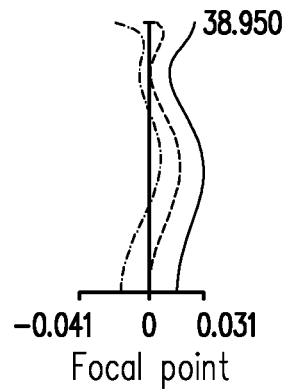
Field curvature (tangential direction) Half field of view (°)
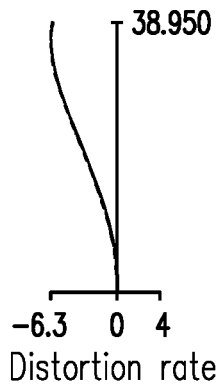
Distortion Half field of view (°)
FIG. 7A    FIG. 7B    FIG. 7C    FIG. 7D

| First Embodiment |||||||
|---|---|---|---|---|---|---|
| Effective focal length=3.564 mm ,Half field of view=38.950° ,System length= 16.696 mm, F-number=1.850, Image height= 2.705 mm |||||||
| Element | Surface | Radius (mm) | Thickness (mm) | Refractive index | Abbe number | Focal length (mm) |
| Object |  | Infinite | Infinite |  |  |  |
| First lens element 1 | Object-side Surface 15 | 11.566 | 2.089 | 1.853 | 23.784 | 21.171 |
|  | Image-side Surface 16 | 29.489 | 1.079 |  |  |  |
| Second lens element 2 | Object-side Surface 25 | -9.914 | 1.584 | 1.537 | 56.150 | -3.788 |
|  | Image-side Surface 26 | 2.701 | 0.853 |  |  |  |
| Third lens element 3 | Object-side Surface 35 | 3.254 | 0.573 | 1.647 | 22.418 | 68.585 |
|  | Image-side Surface 36 | 3.268 | 0.892 |  |  |  |
| Aperture 0 |  | Infinite | 0.106 |  |  |  |
| Fourth lens element 4 | Object-side Surface 45 | 35.867 | 2.666 | 1.537 | 56.150 | 102.684 |
| (Adhering material) | Image-side Surface 46 | -1.639 | 0.010 | 1.537 | 56.150 |  |
| Fifth lens element 5 | Object-side Surface 55 | -1.639 | 0.533 | 1.647 | 22.418 | 5.651 |
|  | Image-side Surface 56 | -2.707 | 0.020 |  |  |  |
| Sixth lens element 6 | Object-side Surface 65 | 3.796 | 2.780 | 1.537 | 56.150 | 9.697 |
|  | Image-side Surface 66 | 10.434 | 1.409 |  |  |  |
| Filter 9 | Object-side Surface 95 | Infinite | 0.700 | 1.518 | 64.166 |  |
|  | Image-side Surface 96 | Infinite | 1.400 |  |  |  |
|  | Image plane 99 | Infinite |  |  |  |  |

FIG. 8

| Surface | K | $a_4$ | $a_6$ | $a_8$ |
|---|---|---|---|---|
| 25 | -4.593219E+00 | 5.639381E-03 | -3.507350E-04 | 1.480331E-05 |
| 26 | -3.041212E-01 | -6.653210E-03 | 2.209802E-03 | -2.502798E-04 |
| 35 | -8.934509E+00 | 1.571646E-02 | -1.121723E-02 | 2.639342E-03 |
| 36 | 3.686092E+00 | 2.671974E-03 | -4.724903E-03 | 2.013581E-03 |
| 45 | 0.000000E+00 | 1.414796E-02 | 1.344389E-03 | 3.065990E-04 |
| 46 | -1.000000E+00 | -2.193636E-02 | 2.775716E-03 | -4.724774E-03 |
| 55 | -1.000000E+00 | -2.193636E-02 | 2.775716E-03 | -4.724774E-03 |
| 56 | 0.000000E+00 | 1.384866E-03 | 8.065967E-04 | -4.377164E-04 |
| 65 | 0.000000E+00 | -4.189711E-04 | -2.579952E-04 | 8.419053E-05 |
| 66 | 0.000000E+00 | 7.728111E-03 | -4.329790E-04 | 2.019237E-04 |
| Surface | $a_{10}$ | $a_{12}$ | $a_{14}$ | |
| 25 | -2.632994E-07 | -3.288882E-10 | 0.000000E+00 | |
| 26 | -8.287975E-05 | 3.003716E-05 | 0.000000E+00 | |
| 35 | -7.244035E-04 | 1.355719E-04 | 0.000000E+00 | |
| 36 | -1.240156E-03 | 0.000000E+00 | 0.000000E+00 | |
| 45 | 9.581168E-05 | -7.473289E-05 | 0.000000E+00 | |
| 46 | 1.506401E-03 | -2.482849E-04 | 2.093414E-05 | |
| 55 | 1.506401E-03 | -2.482849E-04 | 2.093414E-05 | |
| 56 | 2.194113E-04 | -4.054874E-05 | 3.639164E-06 | |
| 65 | -1.258040E-05 | 1.066441E-06 | -3.584666E-08 | |
| 66 | -3.722192E-05 | 4.043788E-06 | -9.219034E-09 | |

FIG. 9

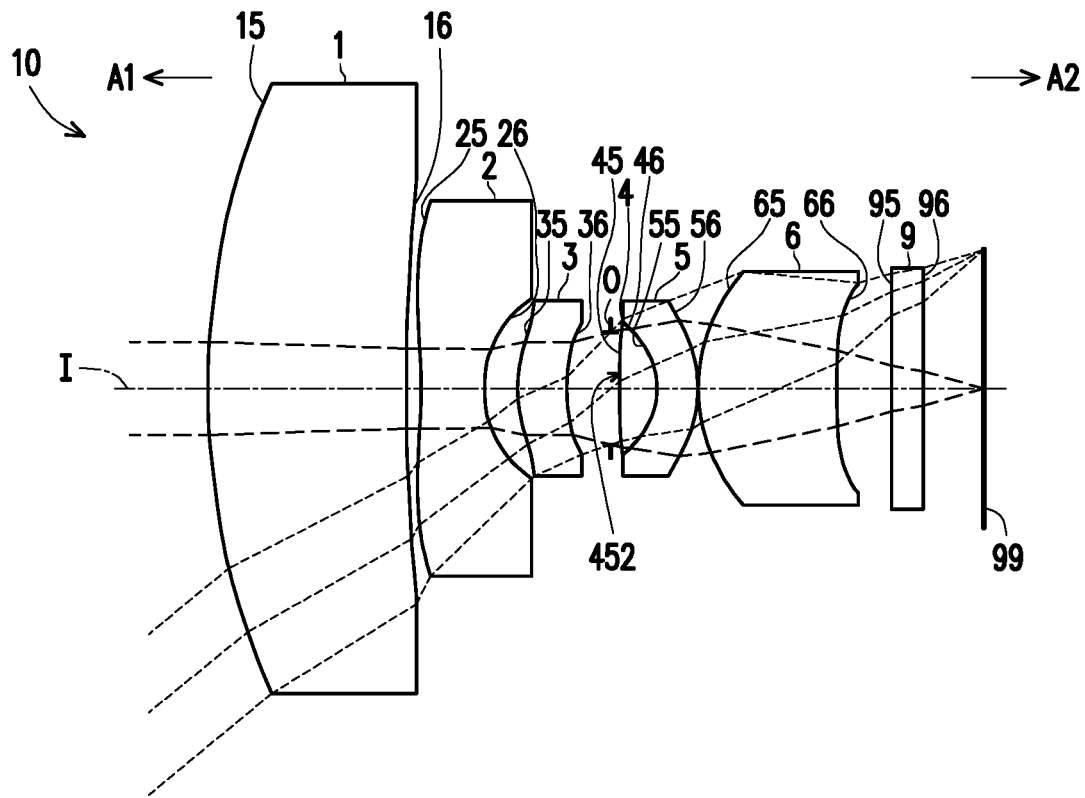
FIG. 10
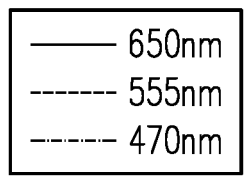
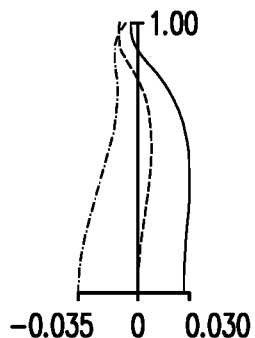
FIG. 11A
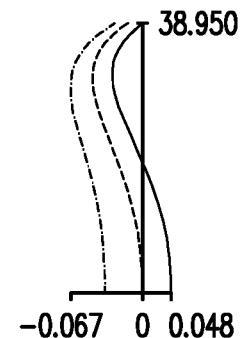
FIG. 11B
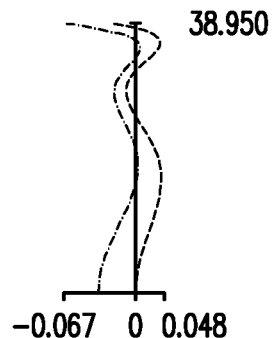
FIG. 11C
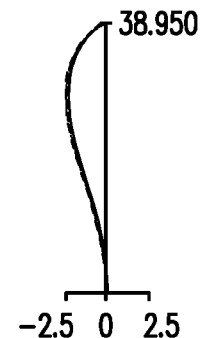
FIG. 11D

| Second Embodiment | | | | | | |
|---|---|---|---|---|---|---|
| Effective focal length=3.871 mm ,Half field of view=38.950° ,System length= 17.684 mm, F-number=1.850, Image height= 3.124 mm | | | | | | |
| Element | Surface | Radius (mm) | Thickness (mm) | Refractive index | Abbe number | Focal length (mm) |
| Object | | Infinite | Infinite | | | |
| First lens element 1 | Object-side Surface 15 | 17.086 | 4.516 | 1.853 | 23.784 | 28.290 |
| | Image-side Surface 16 | 51.392 | 0.332 | | | |
| Second lens element 2 | Object-side Surface 25 | -12.830 | 1.447 | 1.537 | 56.150 | -3.671 |
| | Image-side Surface 26 | 2.420 | 0.758 | | | |
| Third lens element 3 | Object-side Surface 35 | 2.968 | 1.116 | 1.647 | 22.418 | 14.350 |
| | Image-side Surface 36 | 3.717 | 0.998 | | | |
| Aperture 0 | | Infinite | 0.206 | | | |
| Fourth lens element 4 | Object-side Surface 45 | -256.759 | 0.848 | 1.537 | 56.150 | -735.074 |
| (Adhering material) | Image-side Surface 46 | -1.639 | 0.010 | 1.537 | 56.150 | |
| Fifth lens element 5 | Object-side Surface 55 | -1.639 | 0.920 | 1.647 | 22.418 | 6.059 |
| | Image-side Surface 56 | -2.890 | 0.020 | | | |
| Sixth lens element 6 | Object-side Surface 65 | 3.654 | 3.152 | 1.537 | 56.150 | 7.816 |
| | Image-side Surface 66 | 19.771 | 1.262 | | | |
| Filter 9 | Object-side Surface 95 | Infinite | 0.700 | 1.518 | 64.166 | |
| | Image-side Surface 96 | Infinite | 1.400 | | | |
| | Image plane 99 | Infinite | | | | |

FIG. 12

| Surface | K | $a_4$ | $a_6$ | $a_8$ |
|---|---|---|---|---|
| 25 | -4.876381E+00 | 5.901651E-03 | -3.645512E-04 | 1.461138E-05 |
| 26 | -1.247541E-01 | -4.469563E-03 | 1.678724E-03 | -7.891532E-05 |
| 35 | -6.927408E+00 | 1.755357E-02 | -1.058105E-02 | 2.825236E-03 |
| 36 | 4.387444E+00 | -2.885141E-03 | -6.162176E-03 | 1.742998E-03 |
| 45 | 0.000000E+00 | 1.232142E-02 | 1.101015E-03 | 1.702172E-04 |
| 46 | -1.000000E+00 | -2.424874E-02 | 4.697257E-03 | -4.844215E-03 |
| 55 | -1.000000E+00 | -2.424874E-02 | 4.697257E-03 | -4.844215E-03 |
| 56 | 0.000000E+00 | 9.464962E-04 | 1.039734E-03 | -3.817685E-04 |
| 65 | 0.000000E+00 | -8.490113E-04 | -3.442339E-04 | 7.856816E-05 |
| 66 | 0.000000E+00 | 1.100665E-02 | -4.610586E-04 | 2.012948E-04 |
| Surface | $a_{10}$ | $a_{12}$ | $a_{14}$ | |
| 25 | -2.207489E-07 | -1.242343E-09 | | |
| 26 | -5.477944E-05 | 1.209729E-05 | | |
| 35 | -7.499336E-04 | 8.960211E-05 | | |
| 36 | -6.798487E-04 | | | |
| 45 | 2.324786E-05 | -2.007987E-05 | | |
| 46 | 2.306269E-03 | -1.750874E-04 | 2.093419E-05 | |
| 55 | 2.306269E-03 | -1.750874E-04 | 2.093419E-05 | |
| 56 | 2.228315E-04 | -3.927438E-05 | 5.135827E-06 | |
| 65 | -1.267587E-05 | 1.051344E-06 | -4.730831E-08 | |
| 66 | -3.633437E-05 | 3.759355E-06 | -2.101329E-07 | |

FIG. 13

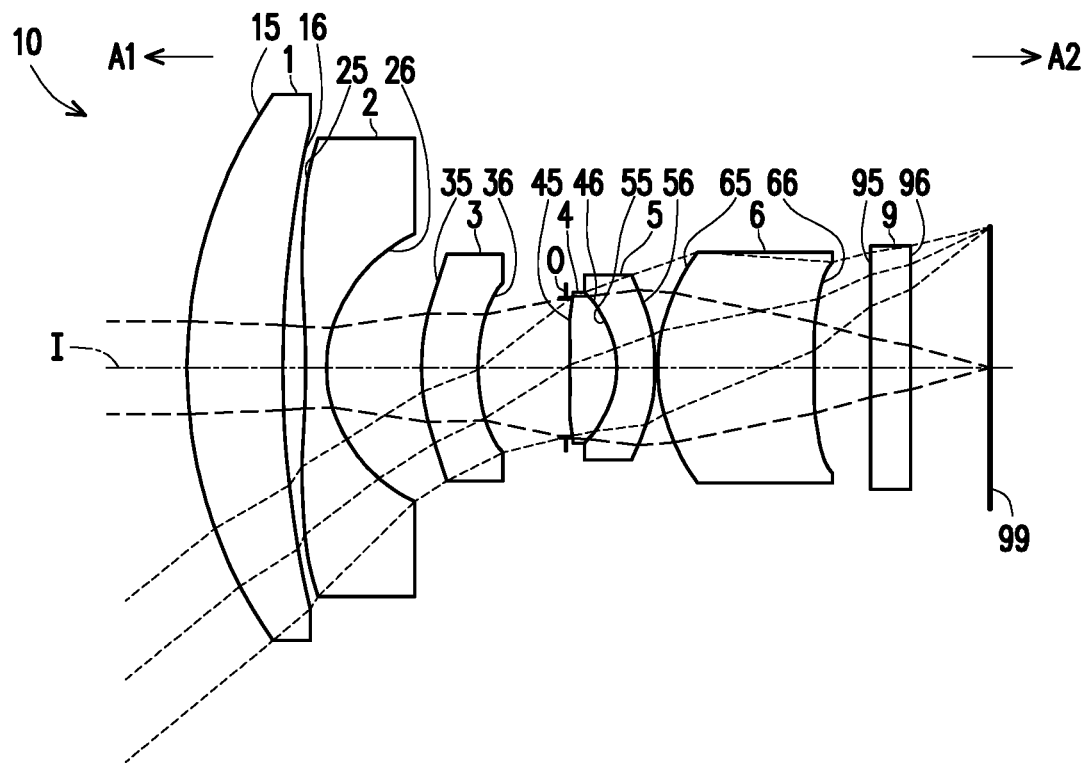
FIG. 14
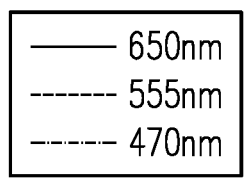
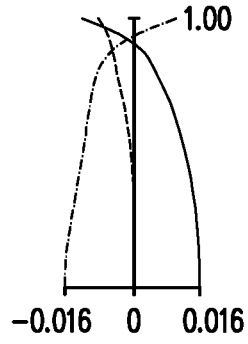
Longitudinal spherical aberration
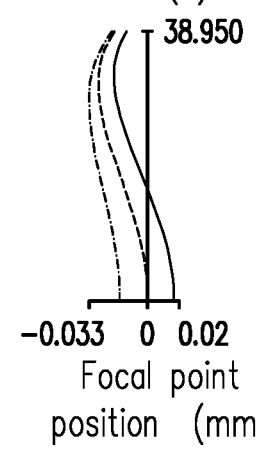
Field curvature (sagittal direction) Half field of view (°)
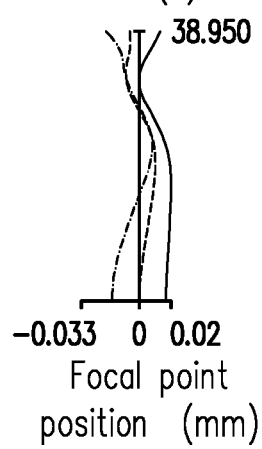
Field curvature (tangential direction) Half field of view (°)
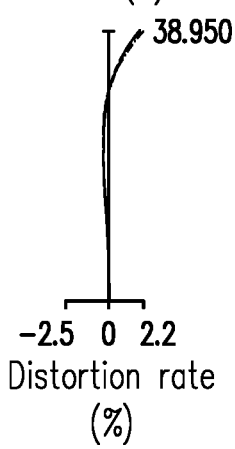
Distortion Half field of view (°)
FIG. 15A    FIG. 15B    FIG. 15C    FIG. 15D

| Third Embodiment |||||||
|---|---|---|---|---|---|---|
| Effective focal length=2.994 mm ,Half field of view=38.950° ,System length= 14.170 mm, F-number=1.850, Image height= 2.461 mm |||||||
| Element | Surface | Radius (mm) | Thickness (mm) | Refractive index | Abbe number | Focal length (mm) |
| Object | | Infinite | Infinite | | | |
| First lens element 1 | Object-side Surface 15 | 8.284 | 1.692 | 1.853 | 23.784 | 16.103 |
| | Image-side Surface 16 | 18.909 | 0.397 | | | |
| Second lens element 2 | Object-side Surface 25 | -14.603 | 0.373 | 1.537 | 56.150 | -3.571 |
| | Image-side Surface 26 | 2.226 | 1.677 | | | |
| Third lens element 3 | Object-side Surface 35 | 3.213 | 0.999 | 1.647 | 22.418 | 30.513 |
| | Image-side Surface 36 | 3.367 | 1.553 | | | |
| Aperture 0 | | Infinite | 0.077 | | | |
| Fourth lens element 4 | Object-side Surface 45 | 106.130 | 0.815 | 1.537 | 56.150 | 303.838 |
| (Adhering material) | Image-side Surface 46 | -1.639 | 0.010 | 1.537 | 56.150 | |
| Fifth lens element 5 | Object-side Surface 55 | -1.639 | 0.672 | 1.647 | 22.418 | 6.663 |
| | Image-side Surface 56 | -3.058 | 0.056 | | | |
| Sixth lens element 6 | Object-side Surface 65 | 3.110 | 2.758 | 1.537 | 56.150 | 6.398 |
| | Image-side Surface 66 | 22.758 | 0.992 | | | |
| Filter 9 | Object-side Surface 95 | Infinite | 0.700 | 1.518 | 64.166 | |
| | Image-side Surface 96 | Infinite | 1.400 | | | |
| | Image plane 99 | Infinite | | | | |

FIG. 16

| Surface | K | $a_4$ | $a_6$ | $a_8$ |
|---|---|---|---|---|
| 25 | -1.096521E+01 | 5.828056E-03 | -3.664782E-04 | 1.466049E-05 |
| 26 | -2.557933E-01 | -6.121503E-03 | -7.154446E-05 | 1.910261E-04 |
| 35 | -7.387721E+00 | 1.865559E-02 | -9.882190E-03 | 3.046774E-03 |
| 36 | 3.420897E+00 | 1.107832E-03 | -4.544346E-03 | 1.968070E-03 |
| 45 | 0.000000E+00 | 1.479098E-02 | 3.307526E-04 | 1.244341E-04 |
| 46 | -1.000000E+00 | -1.996871E-02 | 9.754058E-03 | -3.819599E-03 |
| 55 | -1.000000E+00 | -1.996871E-02 | 9.754058E-03 | -3.819599E-03 |
| 56 | 0.000000E+00 | 1.459591E-03 | 1.287602E-03 | -3.214249E-04 |
| 65 | 0.000000E+00 | -1.589100E-03 | -5.135534E-04 | 6.492475E-05 |
| 66 | 0.000000E+00 | 1.934510E-02 | -7.620350E-05 | 1.906828E-04 |
| Surface | $a_{10}$ | $a_{12}$ | $a_{14}$ | |
| 25 | -2.213209E-07 | -1.569387E-09 | | |
| 26 | -3.768031E-05 | 8.202368E-07 | | |
| 35 | -7.322369E-04 | 7.818787E-05 | | |
| 36 | -7.246836E-04 | | | |
| 45 | 1.823393E-04 | 6.781165E-05 | | |
| 46 | 1.865057E-03 | -9.315895E-04 | 2.093419E-05 | |
| 55 | 1.865057E-03 | -9.315895E-04 | 2.093419E-05 | |
| 56 | 2.140398E-04 | -4.238268E-05 | 9.355920E-06 | |
| 65 | -1.082053E-05 | 1.331810E-06 | -2.250980E-07 | |
| 66 | -4.350855E-05 | 2.587763E-06 | -1.750297E-07 | |

FIG. 17

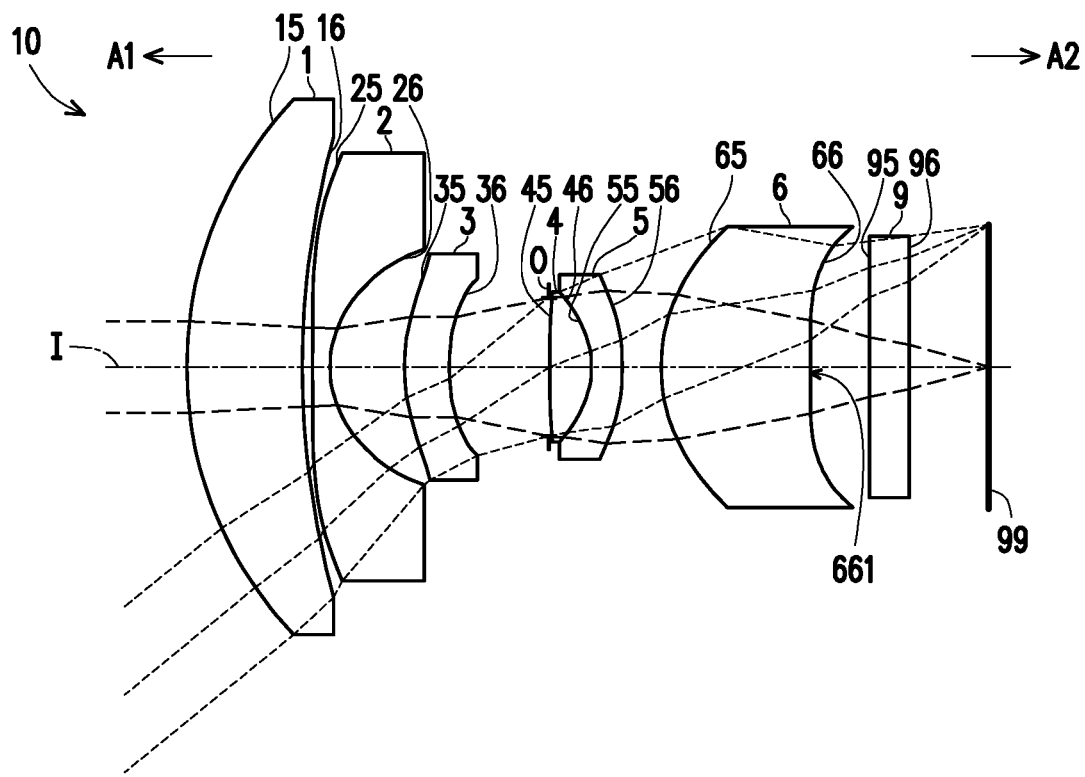
FIG. 18
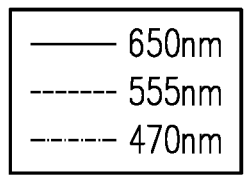
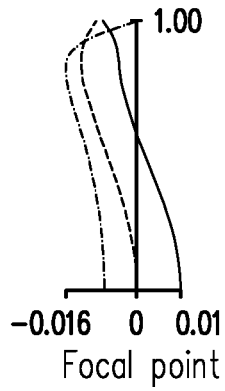
FIG. 19A
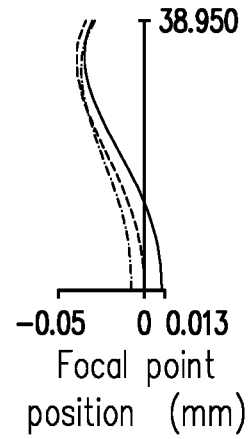
FIG. 19B
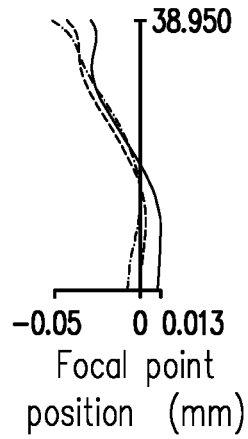
FIG. 19C
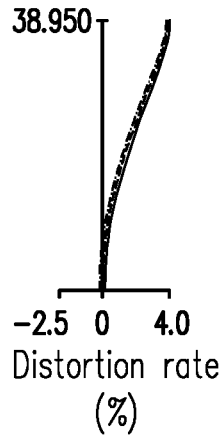
FIG. 19D

| Fourth Embodiment ||||||
|---|---|---|---|---|---|
| Effective focal length=2.975 mm ,Half field of view=38.950° ,System length= 14.161 mm, F-number=1.850, Image height= 2.493 mm ||||||
| Element | Surface | Radius (mm) | Thickness (mm) | Refractive index | Abbe number | Focal length (mm) |
| Object | | Infinite | Infinite | | | |
| First lens element 1 | Object-side Surface 15 | 6.771 | 2.044 | 1.853 | 23.784 | 14.406 |
| | Image-side Surface 16 | 15.426 | 0.175 | | | |
| Second lens element 2 | Object-side Surface 25 | -99.792 | 0.308 | 1.537 | 56.150 | -3.223 |
| | Image-side Surface 26 | 1.762 | 1.317 | | | |
| Third lens element 3 | Object-side Surface 35 | 3.185 | 0.789 | 1.647 | 22.418 | 34.575 |
| | Image-side Surface 36 | 3.351 | 1.762 | | | |
| Aperture 0 | | Infinite | 0.016 | | | |
| Fourth lens element 4 | Object-side Surface 45 | 925.864 | 0.722 | 1.537 | 56.150 | 2650.651 |
| (Adhering material) | Image-side Surface 46 | -1.639 | 0.010 | 1.537 | 56.150 | |
| Fifth lens element 5 | Object-side Surface 55 | -1.639 | 0.551 | 1.647 | 22.418 | 7.212 |
| | Image-side Surface 56 | -3.212 | 0.680 | | | |
| Sixth lens element 6 | Object-side Surface 65 | 2.860 | 2.634 | 1.537 | 56.150 | 5.235 |
| | Image-side Surface 66 | -109.452 | 1.052 | | | |
| Filter 9 | Object-side Surface 95 | Infinite | 0.700 | 1.518 | 64.166 | |
| | Image-side Surface 96 | Infinite | 1.400 | | | |
| | Image plane 99 | Infinite | | | | |

FIG. 20

| Surface | K | $a_4$ | $a_6$ | $a_8$ |
|---|---|---|---|---|
| 25 | 0.000000E+00 | 5.861597E-03 | -3.615785E-04 | 1.506245E-05 |
| 26 | -3.346948E-01 | -7.287545E-03 | -9.345581E-04 | 3.072930E-04 |
| 35 | -6.808827E+00 | 1.774721E-02 | -9.864990E-03 | 3.132315E-03 |
| 36 | 2.987587E+00 | 2.824684E-03 | -3.678235E-03 | 1.919601E-03 |
| 45 | 0.000000E+00 | 1.556027E-02 | -5.936285E-04 | -2.707974E-04 |
| 46 | -1.000000E+00 | -1.845539E-02 | 1.147245E-02 | -3.318937E-03 |
| 55 | -1.000000E+00 | -1.845539E-02 | 1.147245E-02 | -3.318937E-03 |
| 56 | 0.000000E+00 | 1.264286E-03 | 1.159769E-03 | -4.086445E-04 |
| 65 | 0.000000E+00 | -2.082037E-03 | -6.014352E-04 | 5.582292E-05 |
| 66 | 0.000000E+00 | 2.106931E-02 | 9.790037E-05 | 1.538757E-04 |
| Surface | $a_{10}$ | $a_{12}$ | $a_{14}$ | |
| 25 | -2.209825E-07 | -3.024845E-09 | | |
| 26 | -1.692686E-05 | -8.590142E-06 | | |
| 35 | -7.221461E-04 | 7.267066E-05 | | |
| 36 | -6.420968E-04 | | | |
| 45 | 1.988077E-04 | 1.416889E-04 | | |
| 46 | 1.999225E-03 | -1.345299E-03 | 2.093915E-05 | |
| 55 | 1.999225E-03 | -1.345299E-03 | 2.093915E-05 | |
| 56 | 1.790824E-04 | -4.994081E-05 | 1.579486E-05 | |
| 65 | -1.302937E-05 | 1.453754E-06 | -1.885811E-07 | |
| 66 | -4.955101E-05 | 2.042952E-06 | 2.869136E-07 | |

FIG. 21

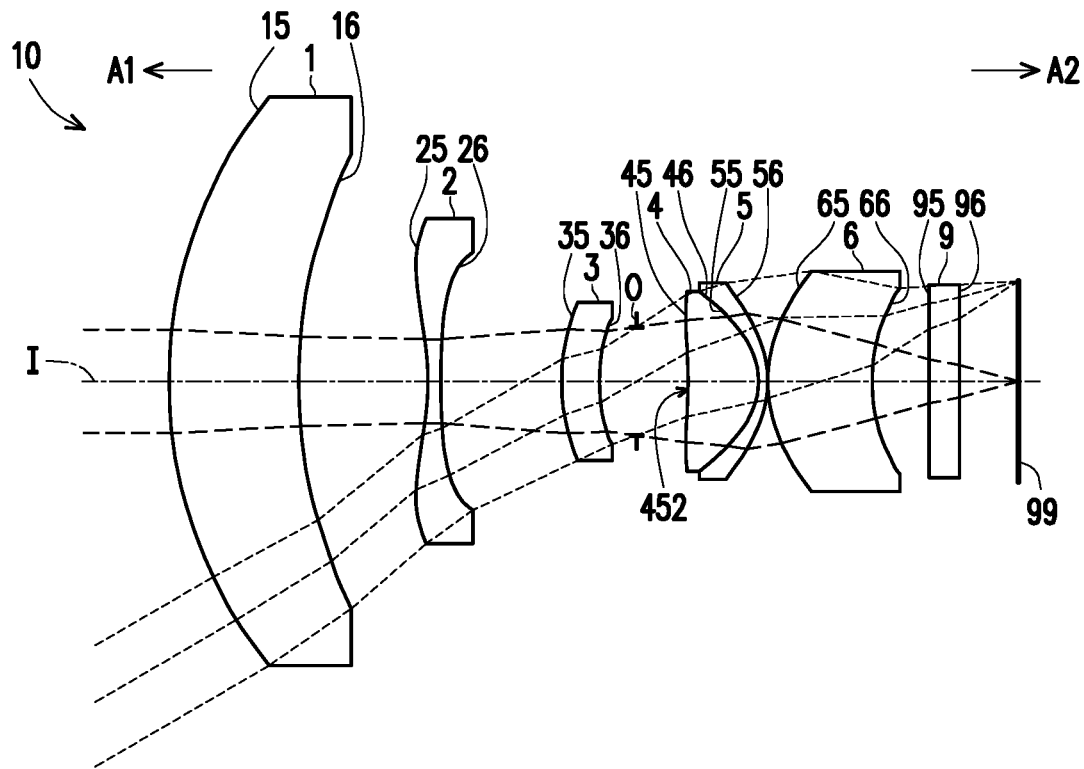
FIG. 22
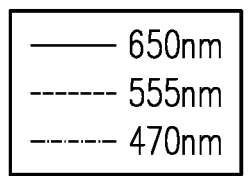
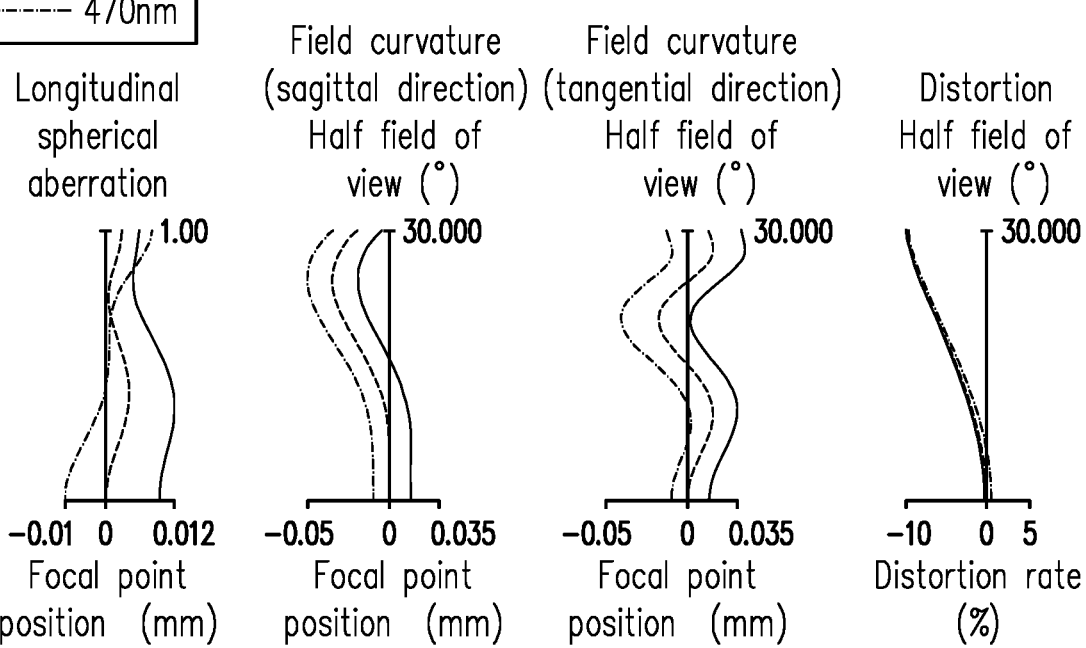
FIG. 23A  FIG. 23B  FIG. 23C  FIG. 23D

| Fifth Embodiment ||||||
|---|---|---|---|---|---|
| Effective focal length=4.447 mm ,Half field of view=30.000° ,System length= 20.000 mm, F-number=1.850, Image height= 2.340 mm ||||||
| Element | Surface | Radius (mm) | Thickness (mm) | Refractive index | Abbe number | Focal length (mm) |
| Object | | Infinite | Infinite | | | |
| First lens element 1 | Object-side Surface 15 | 10.536 | 3.056 | 1.853 | 23.784 | 51.799 |
| | Image-side Surface 16 | 11.988 | 3.042 | | | |
| Second lens element 2 | Object-side Surface 25 | -6.007 | 0.300 | 1.537 | 56.150 | -8.927 |
| | Image-side Surface 26 | 24.105 | 2.856 | | | |
| Third lens element 3 | Object-side Surface 35 | 4.138 | 0.885 | 1.647 | 22.418 | 44.301 |
| | Image-side Surface 36 | 4.429 | 0.871 | | | |
| Aperture 0 | | Infinite | 1.216 | | | |
| Fourth lens element 4 | Object-side Surface 45 | -11.040 | 1.657 | 1.537 | 56.150 | -31.607 |
| (Adhering material) | Image-side Surface 46 | -1.639 | 0.010 | 1.537 | 56.150 | |
| Fifth lens element 5 | Object-side Surface 55 | -1.639 | 0.200 | 1.647 | 22.418 | 5.539 |
| | Image-side Surface 56 | -2.632 | 0.010 | | | |
| Sixth lens element 6 | Object-side Surface 65 | 3.219 | 2.462 | 1.537 | 56.150 | 14.240 |
| | Image-side Surface 66 | 4.076 | 1.336 | | | |
| Filter 9 | Object-side Surface 95 | Infinite | 0.700 | 1.518 | 64.166 | |
| | Image-side Surface 96 | Infinite | 1.400 | | | |
| | Image plane 99 | Infinite | | | | |

FIG. 24

| Surface | K | $a_4$ | $a_6$ | $a_8$ |
|---|---|---|---|---|
| 25 | -3.210254E+00 | 6.822554E-03 | -3.012619E-04 | 1.728384E-05 |
| 26 | 1.670418E+01 | 3.668054E-03 | -1.504733E-04 | 1.105278E-04 |
| 35 | -1.361842E+01 | 1.744776E-02 | -9.169196E-03 | 3.433459E-03 |
| 36 | 3.127421E+00 | 1.080126E-03 | -3.012815E-03 | 2.638616E-03 |
| 45 | 0.000000E+00 | 8.405964E-03 | -1.380054E-04 | -1.499981E-05 |
| 46 | -1.000000E+00 | -8.346340E-03 | 5.415081E-03 | -4.477049E-03 |
| 55 | -1.000000E+00 | -8.346340E-03 | 5.415081E-03 | -4.477049E-03 |
| 56 | 0.000000E+00 | 5.161727E-03 | 9.036515E-04 | -4.339333E-04 |
| 65 | 0.000000E+00 | -2.905359E-03 | -4.424143E-04 | 6.530352E-05 |
| 66 | 0.000000E+00 | 4.912286E-05 | -1.596563E-04 | 1.711695E-04 |
| Surface | $a_{10}$ | $a_{12}$ | $a_{14}$ | |
| 25 | -6.112542E-07 | 1.027772E-08 | | |
| 26 | -1.359695E-05 | 7.943690E-07 | | |
| 35 | -6.305014E-04 | 4.476155E-05 | | |
| 36 | -3.802947E-04 | | | |
| 45 | 5.190682E-05 | -4.518307E-06 | | |
| 46 | 1.717580E-03 | -2.778451E-04 | 1.605566E-05 | |
| 55 | 1.717580E-03 | -2.778451E-04 | 1.605566E-05 | |
| 56 | 2.209344E-04 | -4.108643E-05 | 3.474886E-06 | |
| 65 | -1.377154E-05 | 1.060007E-06 | -6.213873E-08 | |
| 66 | -4.378572E-05 | 3.101756E-06 | 1.523712E-08 | |

FIG. 25

| Sixth Embodiment ||||||||
|---|---|---|---|---|---|---|
| Effective focal length=2.721 mm ,Half field of view=38.950° ,System length= 14.295 mm, F-number=1.850, Image height= 1.859 mm |||||||
| Element | Surface | Radius (mm) | Thickness (mm) | Refractive index | Abbe number | Focal length (mm) |
| Object | | Infinite | Infinite | | | |
| First lens element 1 | Object-side Surface 15 | 19.830 | 1.416 | 1.853 | 23.784 | 14.613 |
| | Image-side Surface 16 | -32.464 | 0.295 | | | |
| Second lens element 2 | Object-side Surface 25 | -5.003 | 0.300 | 1.537 | 56.150 | -2.893 |
| | Image-side Surface 26 | 2.299 | 1.561 | | | |
| Third lens element 3 | Object-side Surface 35 | 2.926 | 0.573 | 1.647 | 22.418 | 15.826 |
| | Image-side Surface 36 | 3.781 | 0.892 | | | |
| Aperture 0 | | Infinite | 0.600 | | | |
| Fourth lens element 4 | Object-side Surface 45 | -212.828 | 2.266 | 1.537 | 56.150 | -609.303 |
| (Adhering material) | Image-side Surface 46 | -1.639 | 0.010 | 1.537 | 56.150 | |
| Fifth lens element 5 | Object-side Surface 55 | -1.639 | 0.200 | 1.647 | 22.418 | 7.039 |
| | Image-side Surface 56 | -3.115 | 0.010 | | | |
| Sixth lens element 6 | Object-side Surface 65 | 3.639 | 1.946 | 1.537 | 56.150 | 6.833 |
| | Image-side Surface 66 | 373.209 | 2.116 | | | |
| Filter 9 | Object-side Surface 95 | Infinite | 0.700 | 1.518 | 64.166 | |
| | Image-side Surface 96 | Infinite | 1.410 | | | |
| | Image plane 99 | Infinite | | | | |

FIG. 28

| Surface | K | $a_4$ | $a_6$ | $a_8$ |
|---|---|---|---|---|
| 25 | -2.220881E+01 | 5.995614E-03 | -5.476389E-04 | 4.103935E-07 |
| 26 | 9.585423E-02 | 1.524966E-02 | -3.765549E-04 | 1.148460E-03 |
| 35 | -6.207940E+00 | 2.866493E-02 | -4.213927E-03 | 4.202658E-03 |
| 36 | 4.538673E+00 | 5.552133E-03 | -4.443019E-04 | 3.397829E-03 |
| 45 | 0.000000E+00 | 1.000480E-02 | 2.410754E-04 | 2.153959E-04 |
| 46 | -1.000000E+00 | -2.409407E-02 | 4.320531E-03 | -4.372036E-03 |
| 55 | -1.000000E+00 | -2.409407E-02 | 4.320531E-03 | -4.372036E-03 |
| 56 | 0.000000E+00 | 6.163398E-07 | 7.664206E-04 | -4.561318E-04 |
| 65 | 0.000000E+00 | -5.052152E-04 | -4.046514E-04 | 8.011535E-05 |
| 66 | 0.000000E+00 | 7.573473E-03 | -4.513967E-04 | 1.352162E-04 |
| Surface | $a_{10}$ | $a_{12}$ | $a_{14}$ | |
| 25 | -1.369432E-07 | 1.337589E-07 | | |
| 26 | 3.399728E-04 | -3.104991E-06 | | |
| 35 | -4.331634E-04 | 5.847775E-05 | | |
| 36 | 2.534936E-05 | | | |
| 45 | 4.017559E-05 | -8.439704E-06 | | |
| 46 | 1.570645E-03 | -2.611301E-04 | 2.093404E-05 | |
| 55 | 1.570645E-03 | -2.611301E-04 | 2.093404E-05 | |
| 56 | 2.185647E-04 | -4.037818E-05 | 3.623963E-06 | |
| 65 | -1.115399E-05 | 1.386767E-06 | -2.966896E-08 | |
| 66 | -3.892996E-05 | 5.028333E-06 | 4.218329E-08 | |

FIG. 29

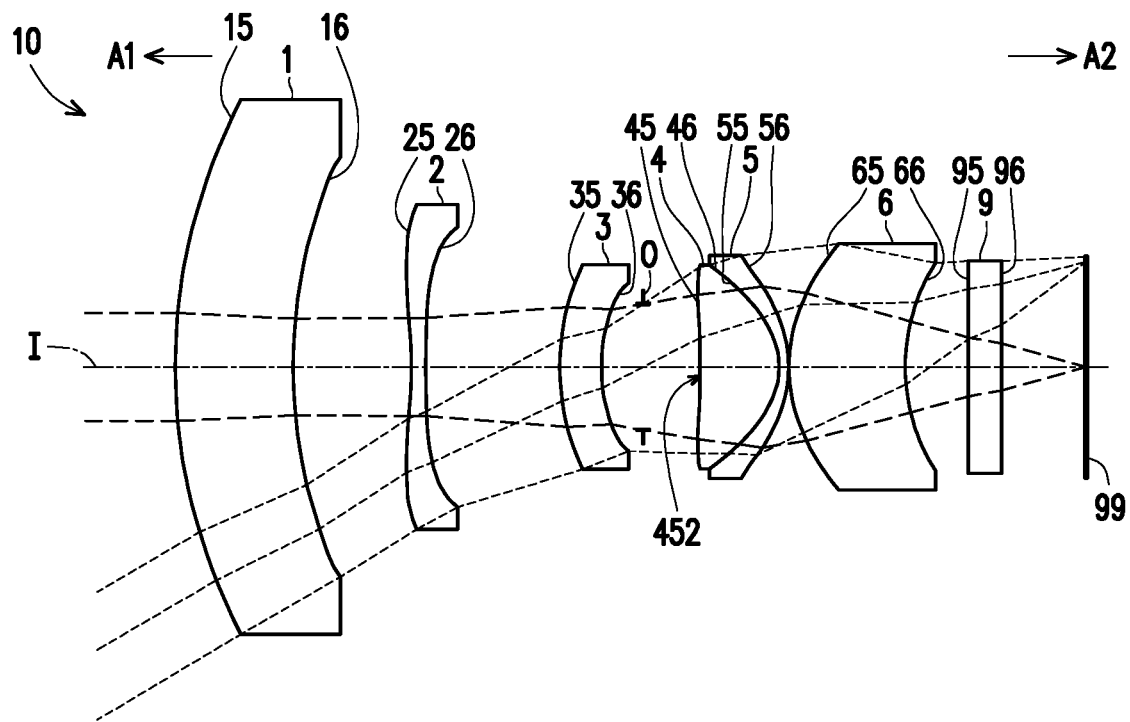
FIG. 30
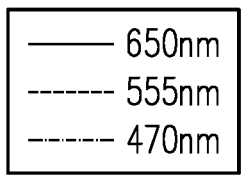
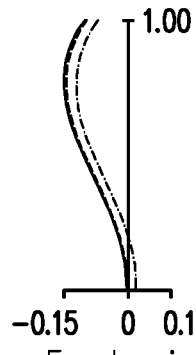
Longitudinal spherical aberration
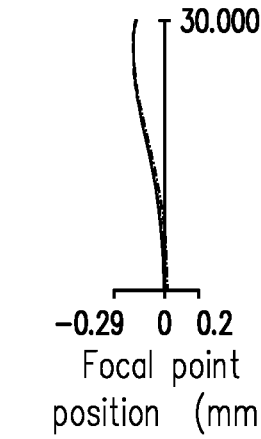
Field curvature (sagittal direction)
Half field of view (°)
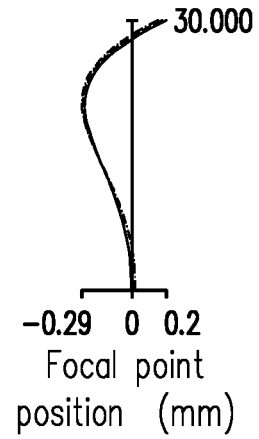
Field curvature (tangential direction)
Half field of view (°)
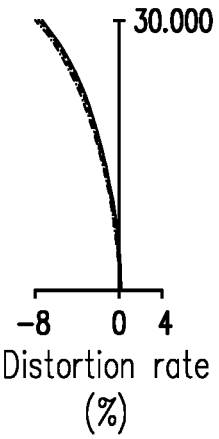
Distortion
Half field of view (°)
FIG. 31A　　FIG. 31B　　FIG. 31C　　FIG. 31D

| Seventh Embodiment | | | | | | |
|---|---|---|---|---|---|---|
| Effective focal length=4.203 mm ,Half field of view=30.000° ,System length= 19.302 mm, F-number=1.850, Image height= 2.212 mm | | | | | | |
| Element | Surface | Radius (mm) | Thickness (mm) | Refractive index | Abbe number | Focal length (mm) |
| Object | | Infinite | Infinite | | | |
| First lens element 1 | Object-side Surface 15 | 11.988 | 2.500 | 1.853 | 23.784 | -491.702 |
| | Image-side Surface 16 | 10.536 | 2.500 | | | |
| Second lens element 2 | Object-side Surface 25 | -10.000 | 0.300 | 1.537 | 56.150 | -13.126 |
| | Image-side Surface 26 | 24.105 | 2.856 | | | |
| Third lens element 3 | Object-side Surface 35 | 4.800 | 0.885 | 1.647 | 22.418 | -97.630 |
| | Image-side Surface 36 | 4.138 | 0.871 | | | |
| Aperture 0 | | Infinite | 1.216 | | | |
| Fourth lens element 4 | Object-side Surface 45 | -11.040 | 1.657 | 1.537 | 56.150 | -31.606 |
| (Adhering material) | Image-side Surface 46 | -1.639 | 0.010 | 1.537 | 56.150 | |
| Fifth lens element 5 | Object-side Surface 55 | -1.639 | 0.200 | 1.647 | 22.418 | 5.539 |
| | Image-side Surface 56 | -2.632 | 0.010 | | | |
| Sixth lens element 6 | Object-side Surface 65 | 3.219 | 2.462 | 1.537 | 56.150 | 14.240 |
| | Image-side Surface 66 | 4.076 | 1.336 | | | |
| Filter 9 | Object-side Surface 95 | Infinite | 0.700 | 1.518 | 64.166 | |
| | Image-side Surface 96 | Infinite | 1.800 | | | |
| | Image plane 99 | Infinite | | | | |

FIG. 32

| Surface | K | $a_4$ | $a_6$ | $a_8$ |
|---|---|---|---|---|
| 25 | -3.210254E+00 | 6.822554E-03 | -3.012619E-04 | 1.728384E-05 |
| 26 | 1.670418E+01 | 3.668054E-03 | -1.504733E-04 | 1.105278E-04 |
| 35 | -1.361842E+01 | 1.744776E-02 | -9.169196E-03 | 3.433459E-03 |
| 36 | 3.127421E+00 | 1.080126E-03 | -3.012815E-03 | 2.638616E-03 |
| 45 | 0.000000E+00 | 8.405964E-03 | -1.380054E-04 | -1.499981E-05 |
| 46 | -1.000000E+00 | -8.346340E-03 | 5.415081E-03 | -4.477049E-03 |
| 55 | -1.000000E+00 | -8.346340E-03 | 5.415081E-03 | -4.477049E-03 |
| 56 | 0.000000E+00 | 5.161727E-03 | 9.036515E-04 | -4.339333E-04 |
| 65 | 0.000000E+00 | -2.905359E-03 | -4.424143E-04 | 6.530352E-05 |
| 66 | 0.000000E+00 | 4.912286E-05 | -1.596563E-04 | 1.711695E-04 |
| Surface | $a_{10}$ | $a_{12}$ | $a_{14}$ | |
| 25 | -6.112542E-07 | 1.027772E-08 | | |
| 26 | -1.359695E-05 | 7.943690E-07 | | |
| 35 | -6.305014E-04 | 4.476155E-05 | | |
| 36 | -3.802947E-04 | | | |
| 45 | 5.190682E-05 | -4.518307E-06 | | |
| 46 | 1.717580E-03 | -2.778451E-04 | 1.605566E-05 | |
| 55 | 1.717580E-03 | -2.778451E-04 | 1.605566E-05 | |
| 56 | 2.209344E-04 | -4.108643E-05 | 3.474886E-06 | |
| 65 | -1.377154E-05 | 1.060007E-06 | -6.213873E-08 | |
| 66 | -4.378572E-05 | 3.101756E-06 | 1.523712E-08 | |

FIG. 33

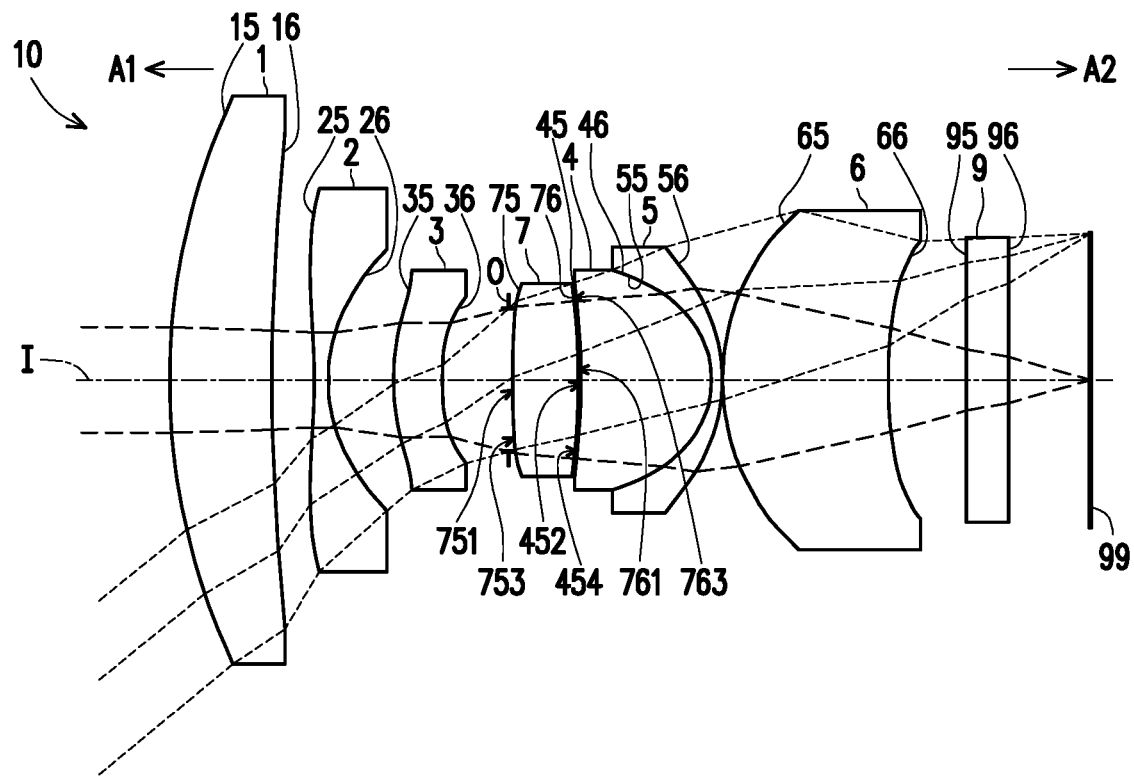
FIG. 34
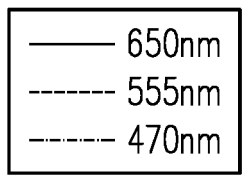
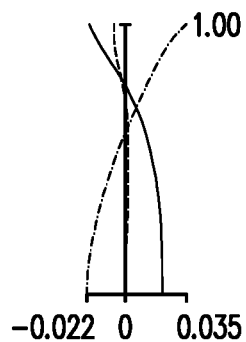
Longitudinal spherical aberration
Focal point position (mm)
FIG. 35A
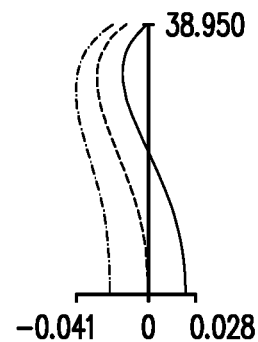
Field curvature (sagittal direction) Half field of view (°)
Focal point position (mm)
FIG. 35B
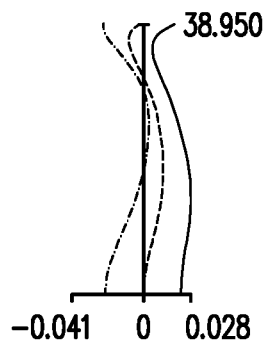
Field curvature (tangential direction) Half field of view (°)
Focal point position (mm)
FIG. 35C
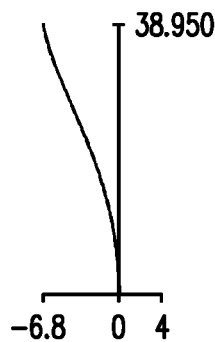
Distortion Half field of view (°)
Distortion rate (%)
FIG. 35D

| Eighth Embodiment ||||||
|---|---|---|---|---|---|
| Effective focal length=4.114 mm ,Half field of view=38.950° ,System length= 19.516 mm, F-number=1.850, Image height= 3.090 mm ||||||
| Element | Surface | Radius (mm) | Thickness (mm) | Refractive index | Abbe number | Focal length (mm) |
| Object |  | Infinite | Infinite |  |  |  |
| First lens element 1 | Object-side Surface 15 | 13.904 | 2.176 | 1.853 | 23.784 | 24.297 |
|  | Image-side Surface 16 | 52.452 | 0.883 |  |  |  |
| Second lens element 2 | Object-side Surface 25 | -13.324 | 0.300 | 1.537 | 56.150 | -4.865 |
|  | Image-side Surface 26 | 3.274 | 1.382 |  |  |  |
| Third lens element 3 | Object-side Surface 35 | 4.314 | 1.028 | 1.647 | 22.418 | 81.408 |
|  | Image-side Surface 36 | 4.259 | 1.410 |  |  |  |
| Aperture 0 |  | Infinite | 0.089 |  |  |  |
| Seventh lens element 7 | Object-side Surface 75 | 48.825 | 1.383 | 1.647 | 22.418 | 18.852 |
|  | Image-side Surface 76 | -16.089 | 0.054 |  |  |  |
| Fourth lens element 4 | Object-side Surface 45 | -15.858 | 2.763 | 1.537 | 56.150 | -45.400 |
| (Adhering material) | Image-side Surface 46 | -2.049 | 0.013 | 1.537 | 56.150 |  |
| Fifth lens element 5 | Object-side Surface 55 | -2.049 | 0.220 | 1.647 | 22.418 | 7.632 |
|  | Image-side Surface 56 | -3.525 | 0.010 |  |  |  |
| Sixth lens element 6 | Object-side Surface 65 | 4.571 | 3.509 | 1.537 | 56.150 | 12.100 |
|  | Image-side Surface 66 | 11.296 | 1.671 |  |  |  |
| Filter 9 | Object-side Surface 95 | Infinite | 0.875 | 1.518 | 64.166 |  |
|  | Image-side Surface 96 | Infinite | 1.750 |  |  |  |
|  | Image plane 99 | Infinite |  |  |  |  |

FIG. 36

| Surface | K | $a_4$ | $a_6$ | $a_8$ |
|---|---|---|---|---|
| 25 | -5.445360E+01 | 3.022413E-03 | -1.225923E-04 | 3.331893E-06 |
| 26 | -2.980927E-01 | -2.168391E-03 | 8.117510E-07 | 2.910410E-05 |
| 35 | -9.064691E+00 | 8.890866E-03 | -3.465503E-03 | 5.960919E-04 |
| 36 | 3.618138E+00 | 5.278545E-03 | -1.530504E-03 | 4.595828E-04 |
| 75 | 0.000000E+00 | 6.680021E-03 | 3.729772E-04 | 1.778561E-05 |
| 46 | -1.000000E+00 | -1.486726E-02 | 4.229686E-04 | -9.931562E-04 |
| 55 | -1.000000E+00 | -1.486726E-02 | 4.229686E-04 | -9.931562E-04 |
| 56 | 0.000000E+00 | 1.618220E-04 | 2.702856E-04 | -9.117965E-05 |
| 65 | 0.000000E+00 | -3.390883E-04 | -1.015316E-04 | 1.727947E-05 |
| 66 | 0.000000E+00 | 3.867244E-03 | -1.750630E-04 | 3.841932E-05 |
| Surface | $a_{10}$ | $a_{12}$ | $a_{14}$ | |
| 25 | -2.307317E-08 | -8.255117E-10 | | |
| 26 | -1.985913E-06 | -2.294626E-07 | | |
| 35 | -1.002045E-04 | 7.636464E-06 | | |
| 36 | -1.362362E-04 | | | |
| 75 | 2.990740E-06 | -7.664310E-07 | | |
| 46 | 2.487976E-04 | -3.623237E-05 | 1.150861E-06 | |
| 55 | 2.487976E-04 | -3.623237E-05 | 1.150861E-06 | |
| 56 | 2.914451E-05 | -3.556040E-06 | 1.897855E-07 | |
| 65 | -1.681808E-06 | 9.294782E-08 | -1.952438E-09 | |
| 66 | -5.061278E-06 | 3.659281E-07 | 1.571090E-09 | |

FIG. 37

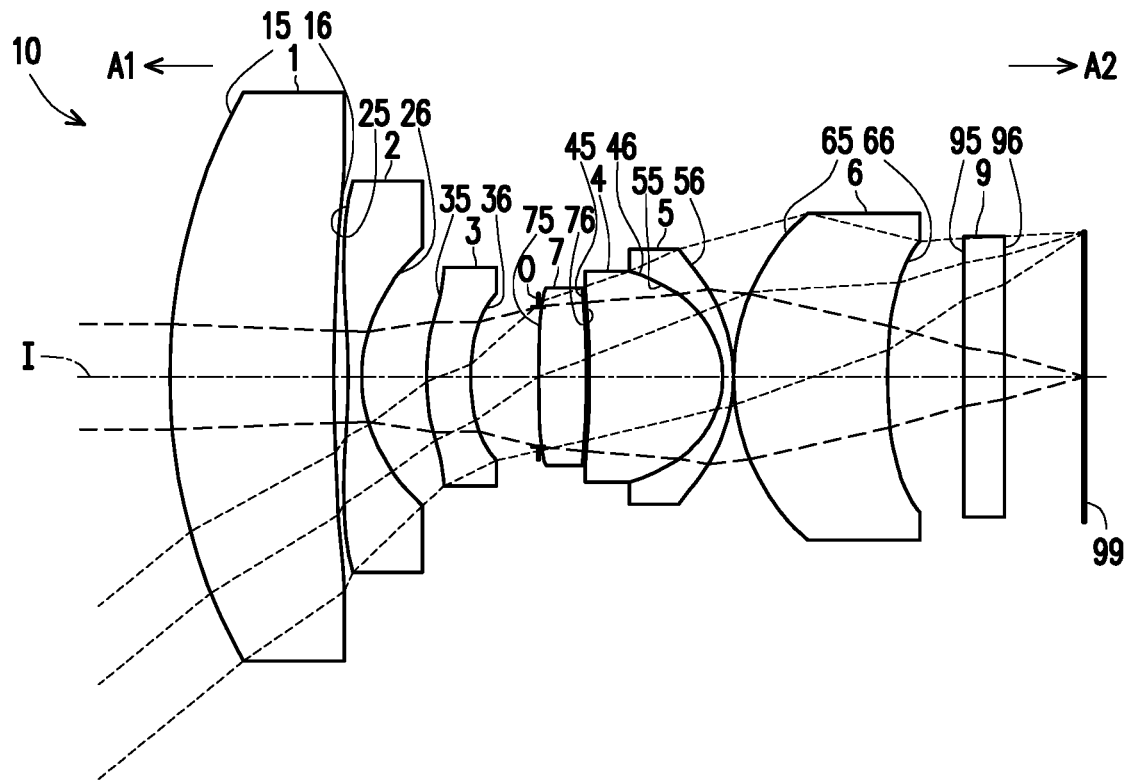
FIG. 38
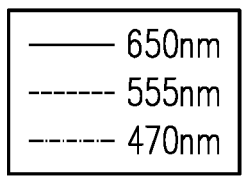
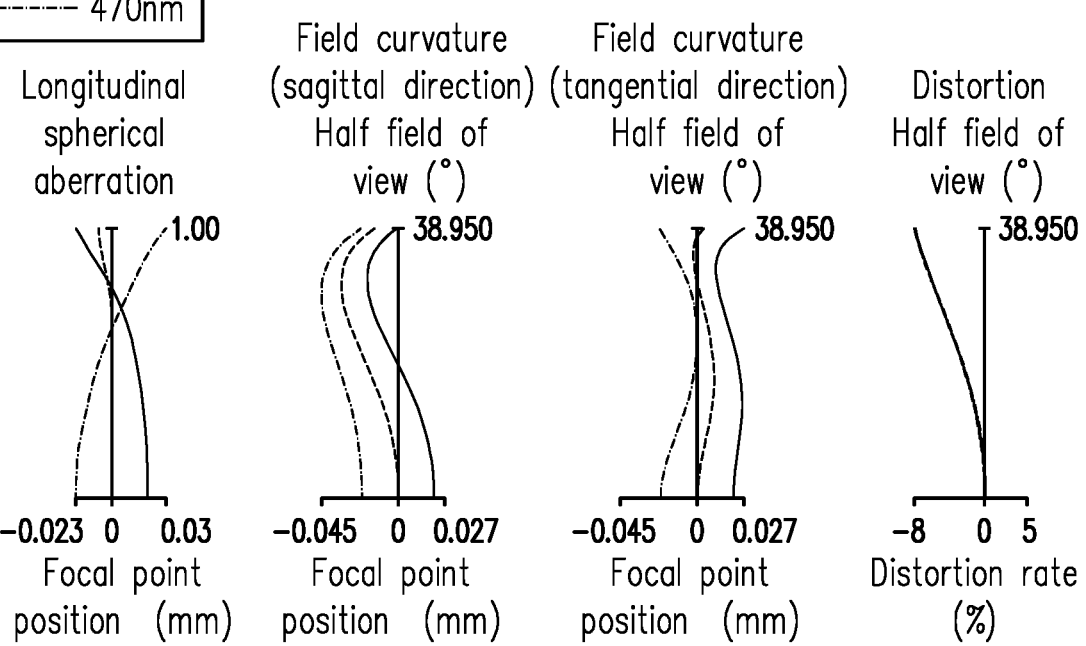
FIG. 39A  FIG. 39B  FIG. 39C  FIG. 39D

| Ninth Embodiment | | | | | | |
|---|---|---|---|---|---|---|
| Effective focal length=4.237 mm ,Half field of view=38.950° ,System length= 19.976 mm, F-number=1.850, Image height= 3.144 mm | | | | | | |
| Element | Surface | Radius (mm) | Thickness (mm) | Refractive index | Abbe number | Focal length (mm) |
| Object | | Infinite | Infinite | | | |
| First lens element 1 | Object-side Surface 15 | 12.660 | 3.581 | 1.853 | 23.784 | 21.909 |
| | Image-side Surface 16 | 46.342 | 0.311 | | | |
| Second lens element 2 | Object-side Surface 25 | -12.076 | 0.300 | 1.537 | 56.150 | -4.819 |
| | Image-side Surface 26 | 3.320 | 1.413 | | | |
| Third lens element 3 | Object-side Surface 35 | 4.401 | 0.965 | 1.647 | 22.418 | 173.590 |
| | Image-side Surface 36 | 4.186 | 1.474 | | | |
| Aperture 0 | | Infinite | 0.010 | | | |
| Seventh lens element 7 | Object-side Surface 75 | 40.885 | 1.046 | 1.647 | 22.418 | 21.131 |
| | Image-side Surface 76 | -20.349 | 0.054 | | | |
| Fourth lens element 4 | Object-side Surface 45 | -19.922 | 2.908 | 1.537 | 56.150 | -57.033 |
| (Adhering material) | Image-side Surface 46 | -2.049 | 0.013 | 1.537 | 56.150 | |
| Fifth lens element 5 | Object-side Surface 55 | -2.049 | 0.228 | 1.647 | 22.418 | 7.504 |
| | Image-side Surface 56 | -3.484 | 0.010 | | | |
| Sixth lens element 6 | Object-side Surface 65 | 4.513 | 3.364 | 1.537 | 56.150 | 11.892 |
| | Image-side Surface 66 | 11.395 | 1.674 | | | |
| Filter 9 | Object-side Surface 95 | Infinite | 0.875 | 1.518 | 64.166 | |
| | Image-side Surface 96 | Infinite | 1.750 | | | |
| | Image plane 99 | Infinite | | | | |

FIG. 40

| Surface | K | $a_4$ | $a_6$ | $a_8$ |
|---|---|---|---|---|
| 25 | -4.701773E+01 | 2.987686E-03 | -1.249404E-04 | 3.327096E-06 |
| 26 | -2.469074E-01 | -1.400959E-03 | -4.434333E-05 | 3.674903E-05 |
| 35 | -9.213544E+00 | 8.814076E-03 | -3.471819E-03 | 5.971062E-04 |
| 36 | 3.282121E+00 | 5.907737E-03 | -1.660501E-03 | 5.071558E-04 |
| 75 | 0.000000E+00 | 6.542530E-03 | 3.716801E-04 | 1.046426E-05 |
| 46 | -1.000000E+00 | -1.442024E-02 | 2.408572E-04 | -9.892364E-04 |
| 55 | -1.000000E+00 | -1.442024E-02 | 2.408572E-04 | -9.892364E-04 |
| 56 | 0.000000E+00 | 1.706522E-04 | 2.672994E-04 | -9.187943E-05 |
| 65 | 0.000000E+00 | -3.313109E-04 | -1.069579E-04 | 1.715844E-05 |
| 66 | 0.000000E+00 | 4.067226E-03 | -1.833385E-04 | 3.925250E-05 |
| Surface | $a_{10}$ | $a_{12}$ | $a_{14}$ | |
| 25 | -2.336900E-08 | -6.465082E-10 | | |
| 26 | -1.368663E-06 | -2.900471E-07 | | |
| 35 | -1.000371E-04 | 7.472419E-06 | | |
| 36 | -1.329981E-04 | | | |
| 75 | 9.574374E-07 | 4.172577E-07 | | |
| 46 | 2.570477E-04 | -3.843631E-05 | 1.150861E-06 | |
| 55 | 2.570477E-04 | -3.843631E-05 | 1.150861E-06 | |
| 56 | 2.919523E-05 | -3.525409E-06 | 1.936922E-07 | |
| 65 | -1.656558E-06 | 9.468672E-08 | -2.173092E-09 | |
| 66 | -5.026184E-06 | 3.572764E-07 | 1.035940E-09 | |

FIG. 41

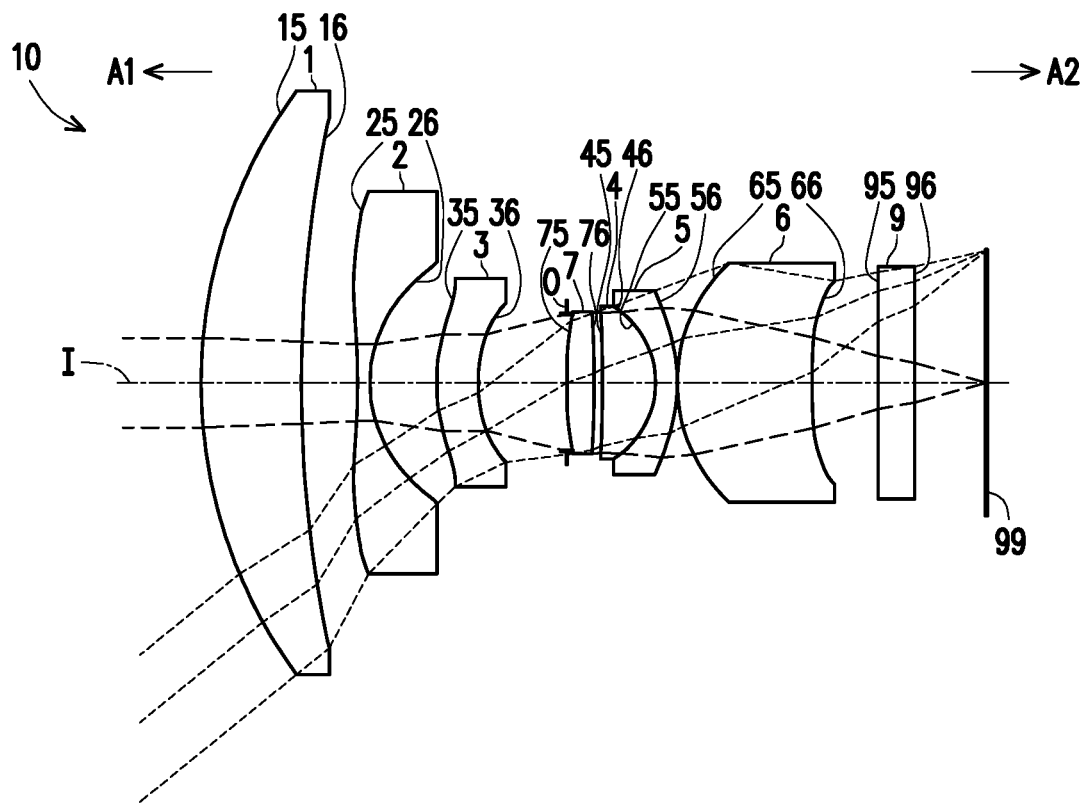
FIG. 42
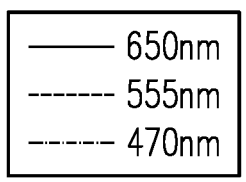
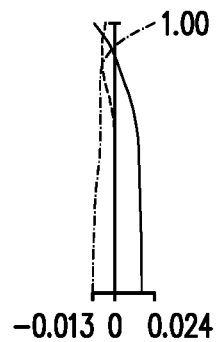
FIG. 43A
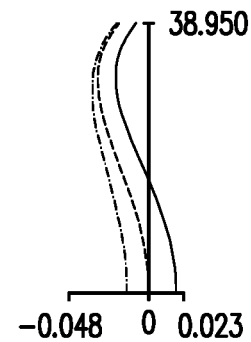
FIG. 43B
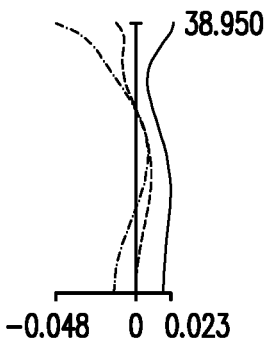
FIG. 43C
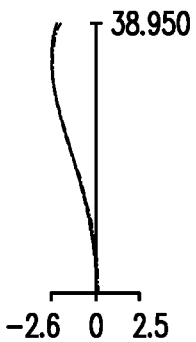
FIG. 43D

| Tenth Embodiment ||||||
|---|---|---|---|---|---|
| Effective focal length=4.019 mm ,Half field of view=38.950° ,System length= 19.116 mm, F-number=1.850, Image height= 3.172 mm ||||||
| Element | Surface | Radius (mm) | Thickness (mm) | Refractive index | Abbe number | Focal length (mm) |
| Object | | Infinite | Infinite | | | |
| First lens element 1 | Object-side Surface 15 | 11.905 | 2.443 | 1.853 | 23.784 | 23.951 |
| | Image-side Surface 16 | 31.347 | 1.367 | | | |
| Second lens element 2 | Object-side Surface 25 | -12.399 | 0.300 | 1.537 | 56.150 | -4.562 |
| | Image-side Surface 26 | 3.077 | 1.625 | | | |
| Third lens element 3 | Object-side Surface 35 | 4.126 | 1.015 | 1.647 | 22.418 | 115.935 |
| | Image-side Surface 36 | 3.943 | 2.153 | | | |
| Aperture 0 | | Infinite | 0.010 | | | |
| Seventh lens element 7 | Object-side Surface 75 | 28.384 | 0.654 | 1.647 | 22.418 | 19.345 |
| | Image-side Surface 76 | -22.206 | 0.200 | | | |
| Fourth lens element 4 | Object-side Surface 45 | -42.234 | 1.291 | 1.537 | 56.150 | -120.913 |
| (Adhering material) | Image-side Surface 46 | -2.049 | 0.013 | 1.537 | 56.150 | |
| Fifth lens element 5 | Object-side Surface 55 | -2.049 | 0.514 | 1.647 | 22.418 | 9.949 |
| | Image-side Surface 56 | -4.262 | 0.010 | | | |
| Sixth lens element 6 | Object-side Surface 65 | 3.888 | 3.275 | 1.537 | 56.150 | 8.880 |
| | Image-side Surface 66 | 14.891 | 1.623 | | | |
| Filter 9 | Object-side Surface 95 | Infinite | 0.875 | 1.518 | 64.166 | |
| | Image-side Surface 96 | Infinite | 1.750 | | | |
| | Image plane 99 | Infinite | | | | |

FIG. 44

| Surface | K | $a_4$ | $a_6$ | $a_8$ |
|---|---|---|---|---|
| 25 | -5.581123E+01 | 3.023577E-03 | -1.253822E-04 | 3.131933E-06 |
| 26 | -2.259925E-01 | -1.684664E-03 | -4.599423E-05 | 4.551872E-05 |
| 35 | -7.699648E+00 | 8.533431E-03 | -3.271653E-03 | 6.355567E-04 |
| 36 | 2.427498E+00 | 4.497531E-03 | -1.587791E-03 | 5.808387E-04 |
| 75 | 0.000000E+00 | 7.913796E-03 | 4.911757E-04 | 1.340163E-05 |
| 46 | -1.000000E+00 | -1.066928E-02 | 6.522544E-04 | -8.632499E-04 |
| 55 | -1.000000E+00 | -1.066928E-02 | 6.522544E-04 | -8.632499E-04 |
| 56 | 0.000000E+00 | 1.373922E-03 | 4.639982E-04 | -7.537039E-05 |
| 65 | 0.000000E+00 | -1.499090E-04 | -1.220611E-04 | 1.460165E-05 |
| 66 | 0.000000E+00 | 8.419548E-03 | -4.988943E-05 | 4.732840E-05 |
| Surface | $a_{10}$ | $a_{12}$ | $a_{14}$ | |
| 25 | -1.949922E-08 | -2.899064E-10 | | |
| 26 | -2.403829E-06 | -3.005861E-07 | | |
| 35 | -9.899677E-05 | 6.176680E-06 | | |
| 36 | -1.002669E-04 | | | |
| 75 | 1.854530E-06 | 2.937582E-06 | | |
| 46 | 3.042071E-04 | -8.468481E-05 | 1.150861E-06 | |
| 55 | 3.042071E-04 | -8.468481E-05 | 1.150861E-06 | |
| 56 | 2.781742E-05 | -3.769673E-06 | 3.452907E-07 | |
| 65 | -1.397252E-06 | 1.364770E-07 | -7.290652E-09 | |
| 66 | -6.464850E-06 | 2.745293E-07 | 8.235175E-08 | |

FIG. 45

| Condition Expression | First Embodiment | Second Embodiment | Third Embodiment | Fourth Embodiment | Fifth Embodiment |
|---|---|---|---|---|---|
| EFL | 3.564 | 3.871 | 2.994 | 2.975 | 4.477 |
| T1 | 2.089 | 4.516 | 1.692 | 2.044 | 3.056 |
| G12 | 1.079 | 0.332 | 0.397 | 0.175 | 3.042 |
| T2 | 1.584 | 1.447 | 0.373 | 0.308 | 0.300 |
| G23 | 0.853 | 0.758 | 1.677 | 1.317 | 2.856 |
| T3 | 0.573 | 1.116 | 0.999 | 0.789 | 0.885 |
| G37 | | | | | |
| T7 | | | | | |
| G74 | | | | | |
| G34 | 0.998 | 1.204 | 1.630 | 1.778 | 2.087 |
| T4 | 2.666 | 0.848 | 0.815 | 0.722 | 1.657 |
| G45 | 0.010 | 0.010 | 0.010 | 0.010 | 0.010 |
| T5 | 0.533 | 0.920 | 0.672 | 0.551 | 0.200 |
| G56 | 0.020 | 0.020 | 0.056 | 0.680 | 0.010 |
| T6 | 2.780 | 3.152 | 2.758 | 2.634 | 2.462 |
| G6F | 1.409 | 1.262 | 0.992 | 1.052 | 1.336 |
| TF | 0.700 | 0.700 | 0.700 | 0.700 | 0.700 |
| GFP | 1.400 | 1.400 | 1.400 | 1.400 | 1.400 |
| BFL | 3.509 | 3.362 | 3.092 | 3.152 | 3.436 |
| ALT | 10.226 | 11.997 | 7.309 | 7.048 | 8.560 |
| TL | 13.186 | 14.321 | 11.078 | 11.009 | 16.564 |
| TTL | 16.696 | 17.684 | 14.170 | 14.161 | 20.000 |
| AAG | 2.960 | 2.324 | 3.769 | 3.960 | 8.005 |

FIG. 46

| Condition Expression | Sixth Embodiment | Seventh Embodiment | Eighth Embodiment | Ninth Embodiment | Tenth Embodiment |
|---|---|---|---|---|---|
| EFL | 2.721 | 4.203 | 4.114 | 4.237 | 4.019 |
| T1 | 1.416 | 2.500 | 2.176 | 3.581 | 2.443 |
| G12 | 0.295 | 2.500 | 0.883 | 0.311 | 1.367 |
| T2 | 0.300 | 0.300 | 0.300 | 0.300 | 0.300 |
| G23 | 1.561 | 2.856 | 1.382 | 1.413 | 1.625 |
| T3 | 0.573 | 0.885 | 1.028 | 0.965 | 1.015 |
| G37 | | | 1.499 | 1.484 | 2.163 |
| T7 | | | 1.383 | 1.046 | 0.654 |
| G74 | | | 0.054 | 0.054 | 0.200 |
| G34 | 1.492 | 2.087 | 2.936 | 2.584 | 3.016 |
| T4 | 2.266 | 1.657 | 2.763 | 2.908 | 1.291 |
| G45 | 0.010 | 0.010 | 0.013 | 0.013 | 0.013 |
| T5 | 0.200 | 0.200 | 0.220 | 0.228 | 0.514 |
| G56 | 0.010 | 0.010 | 0.010 | 0.010 | 0.010 |
| T6 | 1.946 | 2.462 | 3.509 | 3.364 | 3.275 |
| G6F | 2.116 | 1.336 | 1.671 | 1.674 | 1.623 |
| TF | 0.700 | 0.700 | 0.875 | 0.875 | 0.875 |
| GFP | 1.410 | 1.800 | 1.750 | 1.750 | 1.750 |
| BFL | 4.226 | 3.836 | 4.296 | 4.299 | 4.248 |
| ALT | 6.702 | 8.003 | 11.379 | 12.392 | 9.491 |
| TL | 10.069 | 15.466 | 15.220 | 15.677 | 14.868 |
| TTL | 14.295 | 19.302 | 19.516 | 19.976 | 19.116 |
| AAG | 3.368 | 7.463 | 5.223 | 4.331 | 6.031 |

FIG. 47

| Condition Expression | First Embodiment | Second Embodiment | Third Embodiment | Fourth Embodiment | Fifth Embodiment |
|---|---|---|---|---|---|
| (G12+T2+G23+T3+G34)/T1 | 2.435 | 1.075 | 3.000 | 2.136 | 3.000 |
| TTL/EFL | 4.685 | 4.568 | 4.733 | 4.759 | 4.467 |
| TL/EFL | 3.700 | 3.700 | 3.700 | 3.700 | 3.700 |
| ALT/(T1+T6) | 2.100 | 1.565 | 1.643 | 1.507 | 1.551 |
| ALT/(T4+T6) | 1.878 | 3.000 | 2.046 | 2.100 | 2.078 |
| AAG/(T5+G34) | 1.933 | 1.095 | 1.637 | 1.700 | 3.500 |
| (AAG+BFL)/(T4+G12) | 1.728 | 4.821 | 5.663 | 7.927 | 2.435 |
| TL/(T1+G45+T6) | 2.702 | 1.865 | 2.484 | 2.348 | 2.996 |
| TL/(T5+G56+T6) | 3.956 | 3.501 | 3.178 | 2.848 | 6.200 |
| (T1+T4+T5+G45)/T6 | 1.906 | 1.997 | 1.156 | 1.263 | 2.000 |
| (T1+T4+T5+G56)/T6 | 1.909 | 2.000 | 1.173 | 1.518 | 2.000 |
| (T2+G12+G23+G34)/(T4+G45) | 1.687 | 4.362 | 4.939 | 4.888 | 4.970 |
| (T3+G12+G23+G34)/(T4+G56) | 1.304 | 3.931 | 5.400 | 2.895 | 5.321 |
| (T2+G12+G23+G34)/T4 | 1.694 | 4.414 | 5.000 | 4.956 | 5.000 |
| (T2+T3+G12+G34)/(T4+T5) | 1.324 | 2.319 | 2.285 | 2.397 | 3.400 |
| (T2+T3+G23+G34)/(T4+T5) | 1.253 | 2.561 | 3.145 | 3.293 | 3.300 |
| (T2+T3+BFL)/(T6+G34) | 1.500 | 1.360 | 1.018 | 0.963 | 1.016 |
| (T2+T3+BFL)/T1 | 2.712 | 1.312 | 2.639 | 2.078 | 1.512 |

FIG. 48

| Condition Expression | Sixth Embodiment | Seventh Embodiment | Eighth Embodiment | Ninth Embodiment | Tenth Embodiment |
|---|---|---|---|---|---|
| (G12+T2+G23+T3+G34)/T1 | 2.980 | 3.451 | 3.000 | 1.557 | 2.998 |
| TTL/EFL | 5.253 | 4.592 | 4.744 | 4.715 | 4.757 |
| TL/EFL | 3.700 | 3.680 | 3.700 | 3.700 | 3.700 |
| ALT/(T1+T6) | 1.993 | 1.613 | 2.002 | 1.784 | 1.660 |
| ALT/(T4+T6) | 1.591 | 1.943 | 1.814 | 1.976 | 2.079 |
| AAG/(T5+G34) | 1.990 | 3.263 | 1.655 | 1.540 | 1.708 |
| (AAG+BFL)/(T4+G12) | 2.965 | 2.718 | 2.610 | 2.681 | 3.868 |
| TL/(T1+G45+T6) | 2.986 | 3.111 | 2.671 | 2.253 | 2.595 |
| TL/(T5+G56+T6) | 4.670 | 5.789 | 4.071 | 4.352 | 3.913 |
| (T1+T4+T5+G45)/T6 | 2.000 | 1.774 | 1.474 | 2.000 | 1.301 |
| (T1+T4+T5+G56)/T6 | 2.000 | 1.774 | 1.473 | 1.999 | 1.300 |
| (T2+G12+G23+G34)/(T4+G45) | 1.603 | 4.645 | 1.982 | 1.578 | 4.841 |
| (T3+G12+G23+G34)/(T4+G56) | 1.723 | 4.996 | 2.246 | 1.807 | 5.400 |
| (T2+G12+G23+G34)/T4 | 1.610 | 4.673 | 1.991 | 1.585 | 4.888 |
| (T2+T3+G12+G34)/(T4+T5) | 1.079 | 3.108 | 1.725 | 1.327 | 3.157 |
| (T2+T3+G23+G34)/(T4+T5) | 1.592 | 3.300 | 1.892 | 1.678 | 3.300 |
| (T2+T3+BFL)/(T6+G34) | 1.483 | 1.104 | 0.873 | 0.935 | 0.884 |
| (T2+T3+BFL)/T1 | 3.600 | 2.008 | 2.584 | 1.554 | 2.277 |

FIG. 49

OPTICAL IMAGING LENS

CROSS-REFERENCE TO RELATED APPLICATION

This application claims the priority benefit of Chinese application serial no. 201810036952.7, filed on Jan. 15, 2018. The entirety of the above-mentioned patent application is hereby incorporated by reference herein and made a part of this specification.

BACKGROUND OF THE INVENTION

1. Field of the Invention

The invention relates to an optical device, and particularly relates to an optical imaging lens.

2. Description of Related Art

As portable electronic products with novel specifications emerge one after another, the development of a crucial part, i.e., the optical imaging lens, is also diversified. Meanwhile, the applications of vehicle lenses continue to broaden through the development of science and technology. For example, vehicle lenses are applicable in car-backing systems, 360 degree panoramic systems, lane departure warning systems, rear surveillance systems, and advanced driver assistance systems (ADAS). However, compared with the imaging quality of lenses for mobile phones, the imaging quality of vehicle lenses still requires refinement.

However, when designing an optical lens, an optical lens having both a miniaturized size and a desirable imaging quality cannot be simply manufactured by scaling down a lens with a desirable imaging quality. The design not only involves material properties but also needs to take practical production issues, such as manufacturing and assembling yield rates, into consideration. Thus, how to facilitate the imaging quality of vehicle lenses under the premise of maintaining the large aperture, the field of view, and the lens length has become an issue to work on.

SUMMARY OF THE INVENTION

One or some exemplary embodiments of the invention provide an optical imaging lens having desirable optical parameters and rendering a desirable imaging quality.

An embodiment of the invention provides an optical imaging lens including a first lens element, a second lens element, a third lens element, a fourth lens element, a fifth lens element, and a sixth lens element arranged in sequence from an object side to an image side along an optical axis. Each of the first lens element through the sixth lens element has an object-side surface facing toward the object side and allowing imaging rays to pass through as well as an image-side surface facing toward the image side and allowing the imaging rays to pass through. The first lens element is a lens element having refracting power in a first order from the object side to the image side. The second lens element is a lens element having refracting power in a second order from the object side to the image side and the second lens element has negative refracting power. The third lens element is a lens element having refracting power in a third order from the object side to the image side, and an optical axis region of the image-side surface of the third lens element is a concave. The fourth lens element is a lens element having refracting power in a third order from the image side to the object side. The fifth lens element is a lens element having refracting power in a second order from the image side to the object side. The sixth lens element is a lens element having refracting power in a first order from the image side to the object side. There is no air gap between the fourth lens element and the fifth lens element. A ratio between a distance from the image-side surface of the first lens element to the object-side surface of the fourth lens element along the optical axis and a thickness of the first lens element along the optical axis is less than or equal to 3.000.

Based on the above, the optical imaging lens according to the embodiments of the invention is effective in terms of the following. By satisfying the number of lens elements having refracting power, that the second lens element has negative refracting power, that the optical axis region of the image-side surface of the third lens element is a concave, that there is no air gap between the fourth lens element and the fifth lens element, and a condition $(G12+T2+G23+T3+G34)/T1 \leq 3.000$, the optical imaging lens according to the embodiments of the invention may have desirable optical parameters and a desirable imaging quality.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6 is a schematic diagram illustrating an optical imaging lens according to a first embodiment of the invention.

FIGS. 7A to 7D are diagrams illustrating a longitudinal spherical aberration and various aberrations of the optical imaging lens according to the first embodiment.

FIG. 8 shows detailed optical data of the optical imaging lens according to the first embodiment of the invention.

FIG. 9 shows aspheric parameters pertaining to the optical imaging lens according to the first embodiment of the invention.

FIG. 10 is a schematic diagram illustrating an optical imaging lens according to a second embodiment of the invention.

FIGS. 11A to 11D are diagrams illustrating a longitudinal spherical aberration and various aberrations of the optical imaging lens according to the second embodiment.

FIG. 12 shows detailed optical data of the optical imaging lens according to the second embodiment of the invention.

FIG. 13 shows aspheric parameters pertaining to the optical imaging lens according to the second embodiment of the invention.

FIG. 14 is a schematic diagram illustrating an optical imaging lens according to a third embodiment of the invention.

FIGS. 15A to 15D are diagrams illustrating a longitudinal spherical aberration and various aberrations of the optical imaging lens according to the third embodiment.

FIG. 16 shows detailed optical data of the optical imaging lens according to the third embodiment of the invention.

FIG. 17 shows aspheric parameters pertaining to the optical imaging lens according to the third embodiment of the invention.

FIG. 18 is a schematic diagram illustrating an optical imaging lens according to a fourth embodiment of the invention.

FIGS. 19A to 19D are diagrams illustrating a longitudinal spherical aberration and various aberrations of the optical imaging lens according to the fourth embodiment.

FIG. 20 shows detailed optical data of the optical imaging lens according to the fourth embodiment of the invention.

FIG. 21 shows aspheric parameters pertaining to the optical imaging lens according to the fourth embodiment of the invention.

FIG. 22 is a schematic diagram illustrating an optical imaging lens according to a fifth embodiment of the invention.

FIGS. 23A to 23D are diagrams illustrating a longitudinal spherical aberration and various aberrations of the optical imaging lens according to the fifth embodiment.

FIG. 24 shows detailed optical data of the optical imaging lens according to the fifth embodiment of the invention.

FIG. 25 shows aspheric parameters pertaining to the optical imaging lens according to the fifth embodiment of the invention.

FIG. 28 shows detailed optical data of the optical imaging lens according to the sixth embodiment of the invention.

FIG. 29 shows aspheric parameters pertaining to the optical imaging lens according to the sixth embodiment of the invention.

FIG. 30 is a schematic diagram illustrating an optical imaging lens according to a seventh embodiment of the invention.

FIGS. 31A to 31D are diagrams illustrating a longitudinal spherical aberration and various aberrations of the optical imaging lens according to the seventh embodiment.

FIG. 32 shows detailed optical data of the optical imaging lens according to the seventh embodiment of the invention.

FIG. 33 shows aspheric parameters pertaining to the optical imaging lens according to the seventh embodiment of the invention.

FIG. 34 is a schematic diagram illustrating an optical imaging lens according to an eighth embodiment of the invention.

FIGS. 35A to 35D are diagrams illustrating a longitudinal spherical aberration and various aberrations of the optical imaging lens according to the eighth embodiment.

FIG. 36 shows detailed optical data of the optical imaging lens according to the eighth embodiment of the invention.

FIG. 37 shows aspheric parameters pertaining to the optical imaging lens according to the eighth embodiment of the invention.

FIG. 38 is a schematic diagram illustrating an optical imaging lens according to a ninth embodiment of the invention.

FIGS. 39A to 39D are diagrams illustrating a longitudinal spherical aberration and various aberrations of the optical imaging lens according to the ninth embodiment.

FIG. 40 shows detailed optical data of the optical imaging lens according to the ninth embodiment of the invention.

FIG. 41 shows aspheric parameters pertaining to the optical imaging lens according to the ninth embodiment of the invention.

FIG. 42 is a schematic diagram illustrating an optical imaging lens according to a tenth embodiment of the invention.

FIGS. 43A to 43D are diagrams illustrating a longitudinal spherical aberration and various aberrations of the optical imaging lens according to the tenth embodiment.

FIG. 44 shows detailed optical data of the optical imaging lens according to the tenth embodiment of the invention.

FIG. 45 shows aspheric parameters pertaining to the optical imaging lens according to the tenth embodiment of the invention.

FIGS. 46 and 48 shows values of respective important parameters and relations thereof of the optical imaging lenses according to the first to fifth embodiments of the invention.

FIGS. 47 and 49 shows values of respective important parameters and relations thereof of the optical imaging lenses according to the sixth to tenth embodiments of the invention.

DESCRIPTION OF THE EMBODIMENTS

Figure 1:
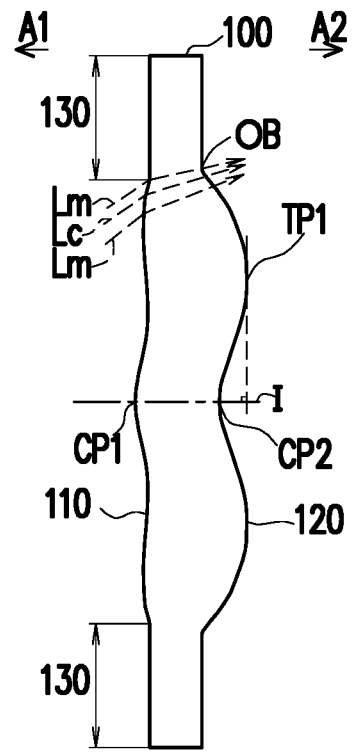
FIG. 1 is a schematic diagram illustrating a surface shape structure of a lens.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
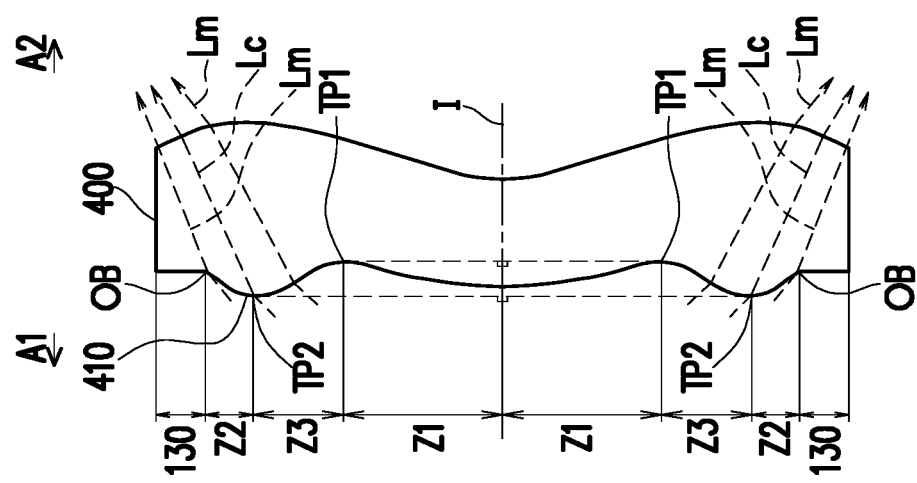
FIG. 4 is a schematic diagram illustrating a surface shape structure of a lens according to Example 2.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
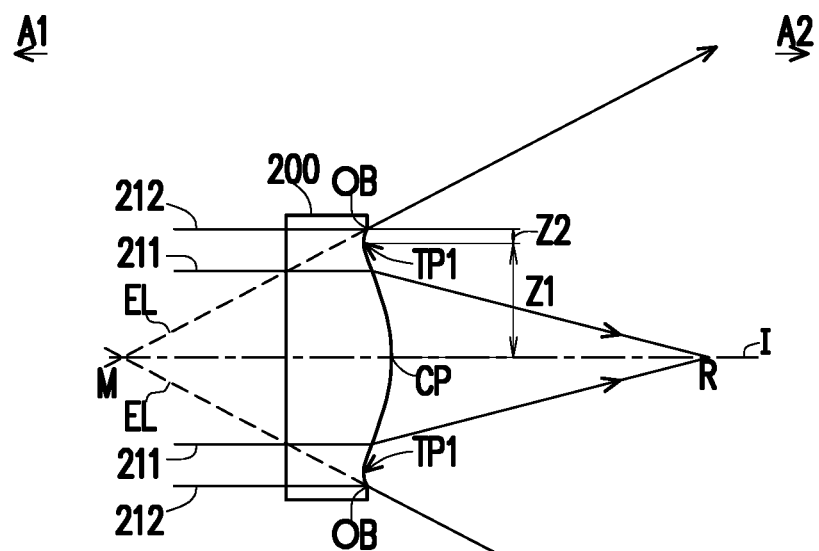
FIG. 2 is a schematic diagram illustrating surface shape concave and convex structures and a light focal point of a lens.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 5:
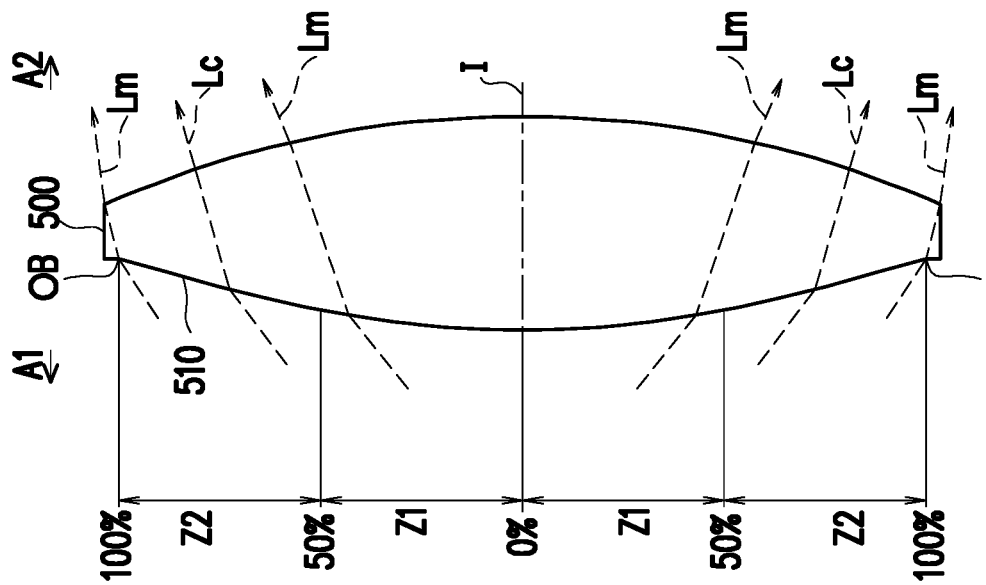
FIG. 5 is a schematic diagram illustrating a surface shape structure of a lens according to Example 3.
Figure 3:
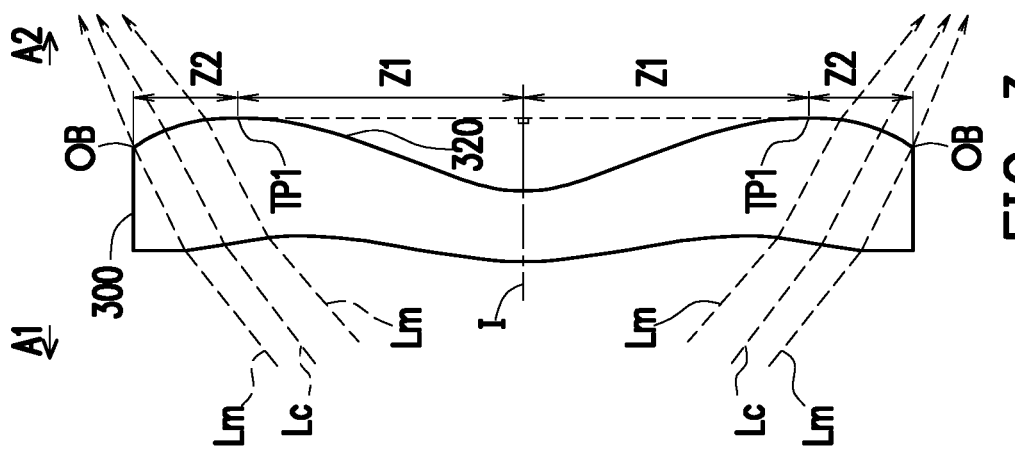
FIG. 3 is a schematic diagram illustrating a surface shape structure of a lens according to Example 1.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

FIG. 6 is a schematic diagram illustrating an optical imaging lens according to a first embodiment of the invention, and FIGS. 7A to 7D are diagrams illustrating a longitudinal spherical aberration and various aberrations of the optical imaging lens according to the first embodiment. Referring to FIG. 6, according to a first embodiment of the invention, an optical imaging lens 10 includes a first lens element 1, a second lens element 2, a third lens element 3, an aperture 0, a fourth lens element 4, a fifth lens element 5, a sixth lens element 6, and a filter 9 arranged in a sequence from an object side A1 to an image side A2 along an optical axis I of the optical imaging lens 10. When rays emitted from an object to be captured enters the optical imaging lens 10, the rays sequentially pass through the first lens element 1, the second lens element 2, the third lens element 3, the aperture 0, the fourth lens element 4, the fifth lens element 5, the sixth lens element 6, and the filter 9 and an image may be formed on an image plane 99. The filter 9 may be an infrared cut-off filter, for example, and is arranged between the sixth lens element 6 and the image plane 99. In addition, the object side A1 is a side facing toward the object to be captured, whereas the image side A2 is a side facing toward the image plane 99.

In the embodiment, the first lens element 1, the second lens element 2, the third lens element 3, the fourth lens element 4, the fifth lens element 5, the sixth lens element 6, and the filter 9 respectively have object-side surfaces 15, 25, 35, 45, 55, 65, and 95 facing toward the object side A1 and allowing imaging rays to pass through as well as image-side surfaces 16, 26, 36, 46, 56, 66, and 96 facing toward the image side A2 and allowing the imaging rays to pass through. In the embodiment, the aperture 0 is disposed between the third lens element 3 and the fourth lens element 4.

The first lens element 1 is a lens element having refracting power in a first order from the object side A1 to the image side A2. The first lens element 1 has positive refracting power. A material of the first lens element 1 is glass. An optical axis region 151 of the object-side surface 15 of the first lens element 1 is convex, and a periphery region 153 thereof is a convex. An optical axis region 162 of the image-side surface 16 of the first lens element 1 is a concave, and a periphery region 164 thereof is a concave. In the embodiment, the object-side surface 15 and the image-side surface 16 of the first lens element 1 are spherical surfaces.

The second lens element 2 is a lens element having refracting power in a second order from the object side A1 to the image side A2. The second lens element 2 has negative refracting power. A material of the second lens element 2 is plastic. An optical axis region 252 of the object-side surface 25 of the second lens element 2 is a concave, and a periphery region 253 thereof is a convex. An optical axis region 262 of the image-side surface 26 of the second lens element 2 is a concave, and a periphery region 264 thereof is a concave. In the embodiment, the object-side surface 25 and the image-side surface 26 of the second lens element 2 are aspheric surfaces.

The third lens element 3 is a lens element having refracting power in a third order from the object side A1 to the image side A2. The third lens element 3 has positive refracting power. A material of the third lens element 3 is plastic. An optical axis region 351 of the object-side surface 35 of the third lens element 3 is a convex, and a periphery region 353 thereof is a convex. An optical axis region 362 of the image-side surface 36 of the third lens element 3 is a concave, and a periphery region 364 thereof is a concave. In the embodiment, the object-side surface 35 and the image-side surface 36 of the third lens element 3 are aspheric surfaces.

The fourth lens element 4 is a lens element having refracting power in a third order from the image side A2 to the object side A1. The fourth lens element 4 has positive refracting power. A material of the fourth lens element 4 is plastic. An optical axis region 451 of the object-side surface 45 of the fourth lens element 4 is a convex, and a periphery region 453 thereof convex. An optical axis region 461 of the image-side surface 46 of the fourth lens element 4 is a convex, and a periphery region 463 thereof is a convex. In the embodiment, the object-side surface 45 and the image-side surface 46 of the fourth lens element 4 are aspheric surfaces.

The fifth lens element 5 is a lens element having refracting power in a second order from the image side A2 to the object side A1. The fifth lens element 5 has positive refracting power. A material of the fifth lens element 5 is plastic. An optical axis region 552 of the object-side surface 55 of the fifth lens element 5 is a concave, and a periphery region 554 thereof is a concave. An optical axis region 561 of the image-side surface 56 of the fifth lens element 5 is a convex, and a periphery region 563 thereof is a convex. In the embodiment, the object-side surface 55 and the image-side surface 56 of the fifth lens element 5 are aspheric surfaces.

The sixth lens element 6 is a lens element having refracting power from the image side A2 to the object side A1. The sixth lens element 6 has positive refracting power. A material of the sixth lens element 6 is plastic. An optical axis region 651 of the object-side surface 65 of the sixth lens element 6 is a convex, and a periphery region 653 thereof is a convex. An optical axis region 662 of the image-side surface 66 of the sixth lens element 6 is a concave, and a periphery region 664 thereof is a concave. In the embodiment, the object-side surface 65 and the image-side surface 66 of the sixth lens element 6 are aspheric surfaces.

In addition, in the embodiment, an adhering material is provided at a gap between the image-side surface 46 of the fourth lens element 4 and the object-side surface 55 of the fifth lens element 5 to adhere the fourth lens element 4 and the fifth lens element 5.

Other detailed optical data of the first embodiment are as shown in FIG. 8. In addition, the effective focal length (EFL) of the optical imaging lens 10 of the first embodiment is 3.564 millimeters (mm), the half field of view (HFOV) thereof is 38.950, the system length thereof is 16.696 mm, the f-number (Fno) thereof is 1.850, and the image height thereof is 2.705 mm. The system length (TTL) refers to a distance from the object-side surface 15 of the first lens element 1 to the image plane 99 along the optical axis I.

Besides, in the embodiment, a total of 10 surfaces, i.e., namely the object-side surfaces 25, 35, 45, 55, and 65 as well as the image-side surfaces 26, 36, 46, 56, and 66 of the second lens element 2, the third lens element 3, the fourth lens element 4, the fifth lens element 5, and the sixth lens element 6, are all general even aspheric surfaces.

The aspheric surfaces are defined based on the following equation.

$$Z(Y) = \frac{Y^2}{R} \left/ \left(1 + \sqrt{1 - (1+K)\frac{Y^2}{R^2}}\right) + \sum_{i=1}^{n} a_i \times Y^i \right. \quad (1)$$

Y: a distance from a point on an aspheric curve to the optical axis;

Z: a depth of the aspheric surface (i.e., a perpendicular distance between the point on the aspheric surface that is spaced by the distance Y from the optical axis and a tangent plane tangent to a vertex of the aspheric surface along the optical axis);

R: a radius of curvature of the surface of the lens element;

K: a conic constant;

$a_i$: $i^{th}$ an aspheric coefficient.

Each aspheric coefficients of the object-side surface 25 of the second lens element 2 to the image-side surface 66 of the sixth lens element 6 in Equation (1) are as shown in FIG. 9. For example, the row number 25 in FIG. 9 indicates that the values are aspheric coefficients of the object-side surface 25 of the second lens element 2. Other rows can be deduced based on the same principle.

In addition, relations of important parameters in the optical imaging lens 10 according to the first embodiment are as shown in FIGS. 46 and 48. In addition, the unit of the respective parameters in FIG. 46 is mm.

Specifically,

T1 is a thickness of the first lens element 1 along the optical axis I;

T2 is a thickness of the second lens element 2 along the optical axis I;

T3 is a thickness of the third lens element 3 along the optical axis I;

T4 is a thickness of the fourth lens element 4 along the optical axis I;

T5 is a thickness of the fifth lens element 5 along the optical axis I;

T6 is a thickness of the sixth lens element 6 along the optical axis I;

G12 is a distance from the image-side surface 16 of the first lens element 1 to the object-side surface 25 of the second lens element 2 along the optical axis I;

G23 is a distance from the image-side surface 26 of the second lens element 2 to the object-side surface 35 of the third lens element 3 along the optical axis I;

G34 is a distance from the image-side surface 36 of the third lens element 3 to the object-side surface 45 of the fourth lens element 4 along the optical axis I;

G45 is a distance from the image-side surface 46 of the fourth lens element 4 to the object-side surface 55 of the fifth lens element 5 along the optical axis I;

G56 is a distance from the image-side surface 56 of the fifth lens element 5 to the object-side surface 65 of the sixth lens element 6 along the optical axis I;

AAG is a sum of the distance from the image-side surface 16 of the first lens element 1 to the object-side surface 25 of the second lens element 2 along the optical axis I, the distance from the image-side surface 26 of the second lens element 2 to the object-side surface 35 of the third lens element 3 along the optical axis I, the distance from the image-side surface 36 of the third lens element 3 to the object-side surface 45 of the fourth lens element 4 along the optical axis I, the distance from the image-side surface 46 of the fourth lens element 4 to the object-side surface 55 of the fifth lens element 5 along the optical axis I, and the distance from the image-side surface 56 of the fifth lens element 5 to the object-side surface 65 of the sixth lens element 6 along the optical axis I, i.e., the sum of G12, G23, G34, G45, and G56;

ALT is a sum of thicknesses of all the lens elements having refracting power of the optical imaging lens 10 along the optical axis I, i.e., the sum of thickness T1, T2, T3, T4, T5, and T6;

TL is a distance from the object-side surface 15 of the first lens element 1 to the image-side surface 66 of the sixth lens element 6 along the optical axis I; and TTL is a distance from the object-side surface 15 of the first lens element 1 to the image plane 99 along the optical axis I;

BFL is a distance from the image-side surface 66 of the sixth lens element 6 to the image plane 99 along the optical axis I;

ImgH is an image height of the optical imaging lens 10; and

EFL is an effective focal length of the optical imaging lens 10.

Besides, it is further defined as follows:

G6F is an air gap between the sixth lens element 6 and the filter 9 along the optical axis I;

TF is a thickness of the filter 9 along the optical axis I;

GFP is an air gap from the filter 9 to the image plane 99 along the optical axis I;

f1 is a focal length of the first lens element 1;

f2 is a focal length of the second lens element 2;

f3 is a focal length of the third lens element 3;

f4 is a focal length of the fourth lens element 4;

f5 is a focal length of the fifth lens element 5;

f6 is a focal length of the sixth lens element 6;

n1 is a refractive index of the first lens element 1;

n2 is a refractive index of the second lens element 2;

n3 is a refractive index of the third lens element 3;

n4 is a refractive index of the fourth lens element 4;

n5 is a refractive index of the fifth lens element 5;

n6 is a refractive index of the sixth lens element 6;

V1 is an Abbe number of the first lens element 1;

V2 is an Abbe number of the second lens element 2;

V3 is an Abbe number of the third lens element 3;

V4 is an Abbe number of the fourth lens element 4;

V5 is an Abbe number of the fifth lens element 5; and

V6 is an Abbe number of the sixth lens element 6.

Referring to FIGS. 7A to 7D, FIG. 7A illustrates the longitudinal spherical aberration of the first embodiment, FIGS. 7B and 7C respectively illustrate the field curvature aberration in the Sagittal direction and the field curvature aberration in the Tangential direction on the image plane 99 of the first embodiment in the condition that the wavelength of the first embodiment is 470 mm, 555 mm, and 650 mm, and FIG. 7D illustrates the distortion aberration on the image plane 99 of the first embodiment in the condition that the wavelength of the first embodiment is 470 mm, 555 mm, and 650 mm. In FIG. 7A illustrating the longitudinal spherical aberration of the first embodiment, the curves representing the respective wavelengths are close to each other and near the middle position, indicating that off-axis rays of each wavelength at different heights are focused near the imaging point. The skew margin of the curve of each wavelength shows that the imaging point deviation of the off-axis ray at different heights is controlled within a range of ±0.026 mm. Therefore, the spherical aberration of the same wavelength is reduced in the first embodiments, and the distances among the three representing wavelengths are also close, indicating that imaging positions of rays of different wavelengths are concentrated. Hence, chromatic aberration is also suppressed.

In FIGS. 7B and 7C illustrating the field curvature aberrations, focal length variations of the three representing wavelengths in the whole field range fall within ±0.041 mm, indicating that the optical system of the first embodiment is able to effectively reduce aberration. In FIG. 7D illustrating the distortion aberration, the distortion aberration of the first embodiment is maintained within a range of ±6.3%, indicating that the distortion aberration of the first embodiment satisfies an imaging quality requirement of an optical system. Hence, compared with known optical lenses, the first embodiment is able to render a preferable imaging quality under a condition that the system length is reduced to about 16.696 mm.

FIG. 10 is a schematic diagram illustrating an optical imaging lens according to a second embodiment of the invention, and FIGS. 11A to 11D are diagrams illustrating a longitudinal spherical aberration and various aberrations of the optical imaging lens according to the second embodiment. Referring to FIG. 10, the second embodiment of the optical imaging lens 10 is similar to the first embodiment, and the differences therebetween mainly include the following: respective optical data, aspheric coefficients and parameters among the lens elements 1, 2, 3, 4, 5, and 6 are different to a more or lesser extent; and the fourth lens element 4 has negative refracting power. In addition, an optical axis region 452 of the object-side surface 45 of the fourth lens element 4 is a concave. To clearly illustrate the drawing, some reference numerals indicating optical axis regions and periphery regions same as those in the first embodiment are omitted in FIG. 10.

Detailed optical data of the optical imaging lens 10 of the second embodiment are as shown in FIG. 12. In addition, the EFL of the whole optical imaging lens 10 of the second embodiment is 3.871 mm, the HFOV thereof is 38.950, the Fno thereof is 1.850, the system length thereof is 17.684 mm, and the image height thereof is 3.124 mm.

Respective aspheric coefficients of the object-side surface 25 of the second lens element 2 to the image-side surface 66 of the sixth lens element 6 of the second embodiment in Equation (1) are as shown in FIG. 13.

In addition, relations of important parameters in the optical imaging lens 10 according to the second embodiment are as shown in FIGS. 46 and 48.

The longitudinal spherical aberration of the second embodiment is shown in FIG. 11A, and imaging point deviations of the off-axis rays in different heights are controlled within a range oft 0.035 mm. In FIGS. 11B and 11C illustrating the field curvature aberrations, focal length variations of the three representing wavelengths in the whole field range fall within ±0.067 mm. The distortion aberration shown in FIG. 11D indicates that the distortion aberration of the second embodiment is maintained within a range of ±2.5%. Based on the above, compared with the first embodiment, the second embodiment is able to render a desirable imaging quality under a condition that the system length is reduced to about 17.684 mm.

In addition, based on the above, the distortion aberration of the third embodiment is more desirable over the distortion aberration of the first embodiment.

FIG. 14 is a schematic diagram illustrating an optical imaging lens according to a third embodiment of the invention, and FIGS. 15A to 15D are diagrams illustrating a longitudinal spherical aberration and various aberrations of the optical imaging lens according to the third embodiment. Referring to FIG. 14, the third embodiment of the optical imaging lens 10 is similar to the first embodiment, and the differences therebetween mainly include the following: respective optical data, aspheric coefficients and parameters among the lens elements 1, 2, 3, 4, 5, and 6 are different to a more or lesser extent. To clearly illustrate the drawing, some reference numerals indicating optical axis regions and periphery regions same as those in the first embodiment are omitted in FIG. 14.

Detailed optical data of the optical imaging lens 10 of the third embodiment are as shown in FIG. 16. In addition, the EFL of the whole optical imaging lens 10 of the third embodiment is 2.994 mm, the HFOV thereof is 38.950, the Fno thereof is 1.850, the system length thereof is 14.170 mm, and the image height thereof is 2.462 mm.

Respective aspheric coefficients of the object side surface 25 of the second lens element 2 to the image-side surface 66 of the sixth lens element 6 of the third embodiment in Equation (1) are as shown in FIG. 17.

In addition, relations of important parameters in the optical imaging lens 10 according to the third embodiment are as shown in FIGS. 46 and 48.

The longitudinal spherical aberration of the third embodiment is shown in FIG. 15A, and imaging point deviations of the off-axis rays in different heights are controlled within a range of ±0.016 mm. In FIGS. 15B and 15C illustrating the field curvature aberrations, focal length variations of the three representing wavelengths in the whole field range fall within ±0.033 mm. The distortion aberration shown in FIG. 15D indicates that the distortion aberration of the third embodiment is maintained within a range of ±2.2%. Based on the above, compared with the first embodiment, the third embodiment is able to render a desirable imaging quality under a condition that the system length is reduced to about 14.170 mm.

In addition, based on the above, the longitudinal spherical aberration of the third embodiment is less than the longitudinal spherical aberration of the first embodiment. The field curvature aberrations of the third embodiment are less than the field curvature aberrations of the first embodiment. The distortion aberration of the third embodiment is less than the distortion aberration of the first embodiment.

FIG. 18 is a schematic diagram illustrating an optical imaging lens according to a fourth embodiment of the invention, and FIGS. 19A to 19D are diagrams illustrating a longitudinal spherical aberration and various aberrations of the optical imaging lens according to the fourth embodiment. Referring to FIG. 18, the fourth embodiment of the optical imaging lens 10 is similar to the first embodiment, and the differences therebetween mainly include the following: respective optical data, aspheric coefficients and parameters among the lens elements 1, 2, 3, 4, 5, and 6 are different to a more or lesser extent; and an optical axis region 661 of the image-side surface 66 of the sixth lens element 6 is a convex. To clearly illustrate the drawing, some reference numerals indicating optical axis regions and periphery regions same as those in the first embodiment are omitted in FIG. 18.

Detailed optical data of the optical imaging lens 10 of the fourth embodiment are as shown in FIG. 20. In addition, the EFL of the whole optical imaging lens 10 of the fourth embodiment is 2.975 mm, the HFOV thereof is 38.950, the Fno thereof is 1.850, the system length thereof is 14.161 mm, and the image height thereof is 2.493 mm.

Respective aspheric coefficients of the object-side surface 25 of the second lens element 2 to the image-side surface 66 of the sixth lens element 6 of the fourth embodiment in Equation (1) are as shown in FIG. 21.

In addition, relations of important parameters in the optical imaging lens 10 according to the fourth embodiment are as shown in FIGS. 46 and 48.

The longitudinal spherical aberration of the fourth embodiment is shown in FIG. 19A, and imaging point deviations of the off-axis rays in different heights are controlled within a range of +0.016 mm. In FIGS. 19B and 19C illustrating the field curvature aberrations, focal length variations of the three representing wavelengths in the whole field range fall within +0.05 mm. The distortion aberration shown in FIG. 19D indicates that the distortion aberration of the fourth embodiment is maintained within a range of +4.0%. Based on the above, compared with the first embodiment, the fourth embodiment is able to render a desirable imaging quality under a condition that the system length is reduced to about 14.161 mm.

In addition, based on the above, the longitudinal spherical aberration of the fourth embodiment is less than the longitudinal spherical aberration of the first embodiment. The distortion aberration of the fourth embodiment is less than the distortion aberration of the first embodiment.

FIG. 22 is a schematic diagram illustrating an optical imaging lens according to a fifth embodiment of the invention, and FIGS. 23A to 23D are diagrams illustrating a longitudinal spherical aberration and various aberrations of the optical imaging lens according to the fifth embodiment. Referring to FIG. 22, the fifth embodiment of the optical imaging lens 10 is similar to the first embodiment, and the differences therebetween mainly include the following: respective optical data, aspheric coefficients and parameters among the lens elements 1, 2, 3, 4, 5, and 6 are different to a more or lesser extent; and the fourth lens element 4 has negative refracting power. In addition, an optical axis region 452 of the object-side surface 45 of the fourth lens element 4 is a concave. To clearly illustrate the drawing, some reference numerals indicating optical axis regions and periphery regions same as those in the first embodiment are omitted in FIG. 22.

Detailed optical data of the optical imaging lens 10 of the fifth embodiment are as shown in FIG. 24. In addition, the EFL of the whole optical imaging lens 10 of the fifth embodiment is 4.477 mm, the HFOV thereof is 30.000°, the Fno thereof is 1.850, the system length thereof is 20.000 mm, and the image height thereof is 2.340 mm.

Respective aspheric coefficients of the object-side surface 25 of the second lens element 2 to the image-side surface 66 of the sixth lens element 6 of the fifth embodiment in Equation (1) are as shown in FIG. 25.

In addition, relations of important parameters in the optical imaging lens 10 according to the fifth embodiment are as shown in FIGS. 46 and 48.

The longitudinal spherical aberration of the fifth embodiment is shown in FIG. 23A, and imaging point deviations of the off-axis rays in different heights are controlled within a range of ±0.012 mm. In FIGS. 23B and 23C illustrating the field curvature aberrations, focal length variations of the three representing wavelengths in the whole field range fall within ±0.05 mm. The distortion aberration shown in FIG. 23D indicates that the distortion aberration of the fifth embodiment is maintained within a range of ±10%. Based on the above, compared with the first embodiment, the fifth embodiment is able to render a desirable imaging quality under a condition that the system length is reduced to about 20.000 mm.

In addition, based on the above, the longitudinal spherical aberration of the fifth embodiment is less than the longitudinal spherical aberration of the first embodiment.

Figure 26:
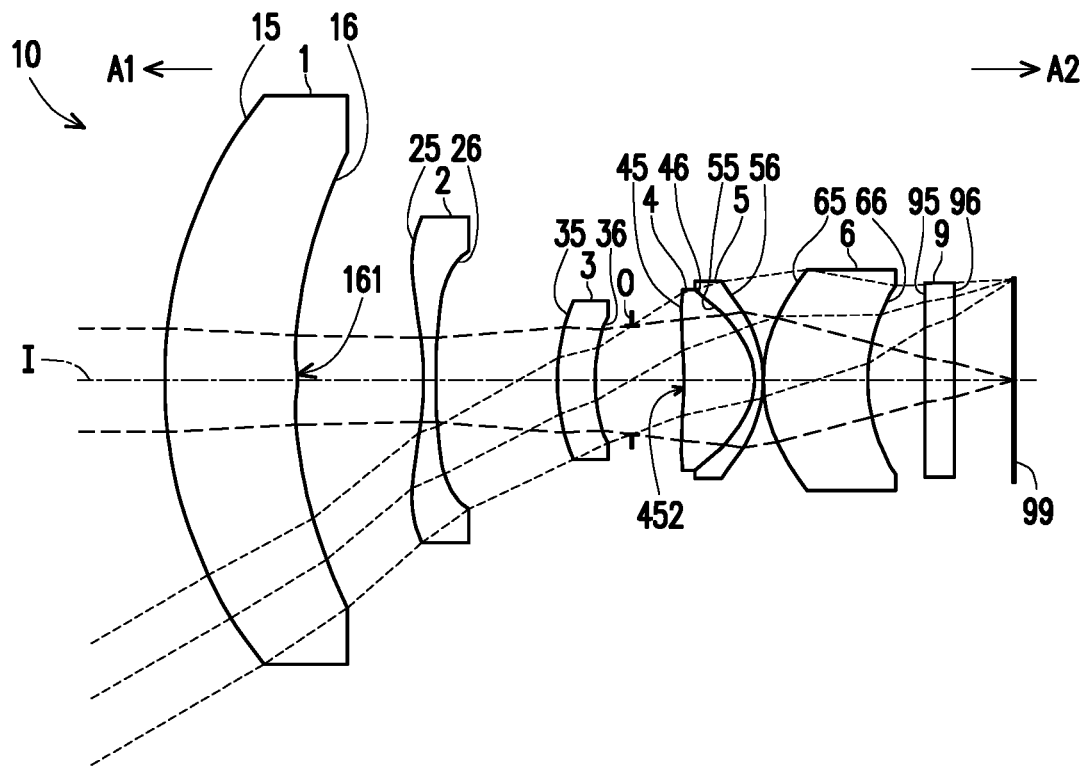
FIG. 26 is a schematic diagram illustrating an optical imaging lens according to a sixth embodiment of the invention.

FIG. 26 is a schematic diagram illustrating an optical imaging lens according to a sixth embodiment of the invention, and FIGS. 27A to 27D are diagrams illustrating a longitudinal spherical aberration and various aberrations of the optical imaging lens according to the sixth embodiment. Referring to FIG. 26, the sixth embodiment of the optical imaging lens 10 is similar to the first embodiment, and the differences therebetween mainly include the following: respective optical data, aspheric coefficients and parameters among the lens elements 1, 2, 3, 4, 5, and 6 are different to a more or lesser extent; and the fourth lens element 4 has negative refracting power. In addition, an optical axis region 161 of the image-side surface 16 of the first lens element 1 is a convex. In addition, an optical axis region 452 of the object side surface 45 of the fourth lens element4 is a concave. To clearly illustrate the drawing, some reference numerals indicating optical axis regions and periphery regions same as those in the first embodiment are omitted in FIG. 26.

Detailed optical data of the optical imaging lens 10 of the sixth embodiment are as shown in FIG. 28. In addition, the EFL of the whole optical imaging lens 10 of the sixth embodiment is 2.721 mm, the HFOV thereof is 38.950°, the Fno thereof is 1.850, the system length thereof is 14.295 mm, and the image height thereof is 1.859 mm.

Respective aspheric coefficients of the object-side surface 25 of the second lens element 2 to the image-side surface 66 of the sixth lens element 6 of the sixth embodiment in Equation (1) are as shown in FIG. 29.

In addition, relations of important parameters in the optical imaging lens 10 according to the sixth embodiment are as shown in FIGS. 47 and 49. In addition, the unit of the respective parameters in FIG. 47 is mm.

Figures 27A, 27B, 27C, 27D:
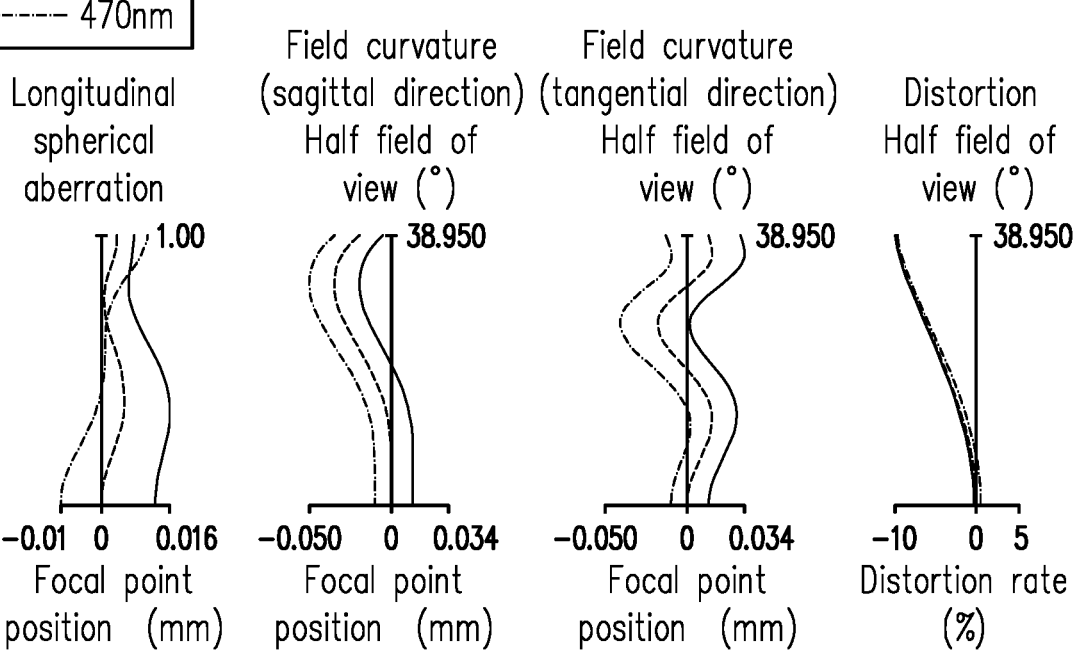
FIGS. 27A to 27D are diagrams illustrating a longitudinal spherical aberration and various aberrations of the optical imaging lens according to the sixth embodiment.

The longitudinal spherical aberration of the sixth embodiment is shown in FIG. 27A, and imaging point deviations of the off-axis rays in different heights are controlled within a range of ±0.016 mm. In FIGS. 27B and 27C illustrating the field curvature aberrations, focal length variations of the three representing wavelengths in the whole field range fall within +0.05 mm. The distortion aberration shown in FIG. 27D indicates that the distortion aberration of the sixth embodiment is maintained within a range of ±10%. Based on the above, compared with the first embodiment, the sixth embodiment is able to render a desirable imaging quality under a condition that the system length is reduced to about 14.295 mm.

In addition, based on the above, the longitudinal spherical aberration of the sixth embodiment is less than the longitudinal spherical aberration of the first embodiment.

FIG. 30 is a schematic diagram illustrating an optical imaging lens according to a seventh embodiment of the invention, and FIGS. 31A to 31D are diagrams illustrating a longitudinal spherical aberration and various aberrations of the optical imaging lens according to the seventh embodiment. Referring to FIG. 30, the seventh embodiment of the optical imaging lens 10 is similar to the first embodiment, and the differences therebetween mainly include the following: respective optical data, aspheric coefficients and parameters among the lens elements 1, 2, 3, 4, 5, and 6 are different to a more or lesser extent; and the first lens element 1 has negative refracting power. The third lens element 3 has negative refracting power. The fourth lens element 4 has negative refracting power. In addition, an optical axis region 452 of the object side surface 45 of the fourth lens element 4 is a concave. To clearly illustrate the drawing, some reference numerals indicating optical axis regions and periphery regions same as those in the first embodiment are omitted in FIG. 30.

Detailed optical data of the optical imaging lens 10 of the seventh embodiment are as shown in FIG. 32. In addition, the EFL of the whole optical imaging lens 10 of the seventh embodiment is 4.203 mm, the HFOV thereof is 30.000°, the Fno thereof is 1.850, the system length thereof is 19.302 mm, and the image height thereof is 2.212 mm.

Respective aspheric coefficients of the object-side surface 25 of the second lens element 2 to the image-side surface 66 of the sixth lens element 6 of the seventh embodiment in Equation (1) are as shown in FIG. 33.

In addition, relations of important parameters in the optical imaging lens 10 according to the seventh embodiment are as shown in FIGS. 47 and 49.

The longitudinal spherical aberration of the seventh embodiment is shown in FIG. 31A, and imaging point deviations of the off-axis rays in different heights are controlled within a range off 0.15 mm. In FIGS. 31B and 31C illustrating the field curvature aberrations, focal length variations of the three representing wavelengths in the whole field range fall within ±0.29 mm. The distortion aberration shown in FIG. 31D indicates that the distortion aberration of the seventh embodiment is maintained within a range of ±8.0%. Based on the above, compared with the first embodiment, the seventh embodiment is able to render a desirable imaging quality under a condition that the system length is reduced to about 19.302 mm.

In addition, based on the above, the longitudinal spherical aberration of the seventh embodiment is less than the longitudinal spherical aberration of the first embodiment. The field curvature aberrations of the seventh embodiment are less than the field curvature aberrations of the first embodiment.

FIG. 34 is a schematic diagram illustrating an optical imaging lens according to an eighth embodiment of the invention, and FIGS. 35A to 35D are diagrams illustrating a longitudinal spherical aberration and various aberrations of the optical imaging lens according to the eighth embodiment. Referring to FIG. 34, the eighth embodiment of the optical imaging lens 10 is similar to the first embodiment, and the differences therebetween mainly include the following: the optical imaging lens 10 of the eighth embodiment of the invention includes the first lens element 1, the second lens element 2, the third lens element 3, the aperture 0, a seventh lens element 7, the fourth lens element 4, the fifth lens element 5, the sixth lens element 6, and the filter 9 arranged in a sequence from an object side A1 to an image side A2 along an optical axis I of the optical imaging lens 10. When rays emitted from the object to be captured enters the optical imaging lens 10, the rays sequentially passes through the first lens element 1, the second lens element 2, the third lens element 3, the aperture 0, the seventh lens element 7, the fourth lens element 4, the fifth lens element 5, the sixth lens element 6, and the filter 9 and an image may be formed on the image plane 99.

In the embodiment, the first lens element 1, the second lens element 2, the third lens element 3, the fourth lens element 4, the fifth lens element 5, the sixth lens element 6, the seventh lens element 7, and the filter 9 respectively have the object-side surfaces 15, 25, 35, 45, 55, 65, 75, and 95 facing toward the object side A1 and allowing the imaging rays to pass through and the image-side surfaces 16, 26, 36, 46, 56, 66, 76, and 96 facing toward the image side A2 and allowing the imaging rays to pass through. In the embodiment, the aperture 0 is disposed between the third lens element 3 and the seventh lens element 7.

The fourth lens element 4 has negative refracting power. An optical axis region 452 of the object-side surface 45 of the fourth lens element 4 is a concave, and a periphery region 454 thereof is a concave. The object-side surface 45 of the fourth lens element 4 is a spherical surface. The image-side surface 46 of the fourth lens element 4 is an aspheric surface.

The seventh lens element 7 is disposed between the third lens element 3 and the fourth lens element 4. The seventh lens element 7 has positive refracting power. An optical axis region 751 of the object-side surface 75 of the seventh lens element 7 is a convex, and a periphery region 753 thereof is a convex. An optical axis region 761 of the image-side surface 76 of the seventh lens element 7 is a convex, and a periphery region 763 thereof a convex. The object-side surface 75 of the seventh lens element 7 is an aspheric surface, and the image-side surface 76 is a spherical surface.

To clearly illustrate the drawing, some reference numerals indicating optical axis regions and periphery regions same as those in the first embodiment are omitted in FIG. 34.

Detailed optical data of the optical imaging lens 10 of the eighth embodiment are as shown in FIG. 36. In addition, the EFL of the whole optical imaging lens 10 of the eighth embodiment is 4.114 mm, the HFOV thereof is 38.950°, the Fno thereof is 1.850, the system length thereof is 19.516 mm, and the image height thereof is 3.090 mm.

Besides, in the eighth embodiment, a total of 10 surfaces, i.e., the object-side surfaces 25, 35, 65, and 75 and the image-side surfaces 26, 36, 66, and 76 of the second lens element 2, the third lens element 3, the sixth lens element 6, and the seventh lens element 7 and the object-side surface 45 of the fourth lens element 4 and the image-side surface 56 of the fifth lens element 5, are all aspheric surfaces, and the aspheric surfaces are defined based on Equation (1). Details in this regard will not be repeated in the following. Respective aspheric coefficients of the surfaces in Equation (1) are as shown in FIG. 37. For example, the row number 25 in FIG. 37 indicates that the values are aspheric coefficients of the object-side surface 25 of the second lens element 2. Other rows are arranged based on the same principle.

In addition, relations of important parameters in the optical imaging lens 10 according to the eighth embodiment are as shown in FIGS. 47 and 49.

Definitions of the parameters in the first lens element 1, the second lens element 2, the third lens element 3, the fourth lens element 4, the fifth lens element 5, and the sixth lens element 6 are approximately similar to the definitions of the parameters mentioned in para. [0082] in the specification, but differ in the following:

T7 is a thickness of the seventh lens element 7 along the optical axis I;

G37 is a distance from the image-side surface 36 of the third lens element 3 to the object-side surface 75 of the seventh lens element 7 along the optical axis I;

G74 is a distance from the image-side surface 76 of the seventh lens element 7 to the object-side surface 45 of the fourth lens element 4 along the optical axis I;

ALT is a sum of thicknesses of all the lens elements having refracting power in the optical imaging lens 10 along the optical axis I, i.e., the sum of T1, T2, T3, T4, T5, T6, and T7;

f7 is a focal length of the seventh lens element 7;

n7 is a refractive index of the seventh lens element 7; and

V7 is an Abbe number of the seventh lens element 7.

Referring to FIGS. 35A to 35D, FIG. 35A illustrates the longitudinal spherical aberration of the eighth embodiment when the wavelength of the eighth embodiment is 650 nm, 555 nm, and 470 nm, FIGS. 35B and 35C respectively illustrate the field curvature aberration in the Sagittal direction and the field curvature aberration in the Tangential direction on the image plane 99 of the eighth embodiment in the condition that the wavelength of the eighth embodiment is 650 mm, 555 mm, and 470 mm, and FIG. 35D illustrates the distortion aberration on the image plane 99 of the eighth embodiment in the condition that the wavelength of the eighth embodiment is 650 mm, 555 mm, and 470 mm. In FIG. 35A illustrating the longitudinal spherical aberration of the eighth embodiment, the curves representing the respective wavelengths are close to each other and near the middle position, indicating that off-axis rays of each wavelength at different heights are focused near the imaging point. The skew margin of the curve of each wavelength shows that the imaging point deviation of the off-axis ray at different heights is controlled within a range of ±0.026 mm. Therefore, the spherical aberration of the same wavelength is reduced in the eighth embodiment, and the distances among the three representing wavelengths are also close, indicating that imaging positions of rays of different wavelengths are concentrated. Hence, chromatic aberration is also suppressed.

In FIGS. 35B and 35C illustrating the field curvature aberrations, focal length variations of the three representing wavelengths in the whole field range fall within ±0.041 mm, indicating that the optical system of the eighth embodiment is able to effectively reduce field curvature aberrations. In FIG. 35D illustrating the distortion aberration, the distortion aberration of the eighth embodiment is maintained within a range of ±6.8%, indicating that the distortion aberration of the eighth embodiment satisfies an imaging quality requirement of an optical imaging lens. Hence, compared with known optical lenses, the eighth embodiment is able to render a desirable imaging quality under a condition that the system length is reduced to about 19.516 mm. Therefore, the eighth embodiment is able to reduce the length of the optical imaging lens under a condition of maintaining a desirable optical performance.

FIG. 38 is a schematic diagram illustrating an optical imaging lens according to a ninth embodiment of the invention, and FIGS. 39A to 39D are diagrams illustrating a longitudinal spherical aberration and various aberrations of the optical imaging lens according to the ninth embodiment. Referring to FIG. 38, the ninth embodiment of the optical imaging lens 10 is similar to the eighth embodiment, and the differences therebetween mainly include the following: respective optical data, aspheric coefficients and parameters among the lens elements 1, 2, 3, 4, 5, 6, and 7 are different to a more or lesser extent. To clearly illustrate the drawing, some reference numerals indicating optical axis regions and periphery regions same as those in the eighth embodiment are omitted in FIG. 38.

Detailed optical data of the optical imaging lens 10 of the ninth embodiment are as shown in FIG. 40. In addition, the EFL of the whole optical imaging lens 10 of the ninth embodiment is 4.237 mm, the HFOV thereof is 38.950°, the Fno thereof is 1.850, the system length thereof is 19.976 mm, and the image height thereof is 3.144 mm.

Respective aspheric coefficients of the object-side surface 25 of the second lens element 2 to the image-side surface 76 of the seventh lens element 7 of the ninth embodiment in Equation (1) are as shown in FIG. 41.

In addition, relations of important parameters in the optical imaging lens 10 according to the ninth embodiment are as shown in FIGS. 47 and 49.

The longitudinal spherical aberration of the ninth embodiment is shown in FIG. 39A, and imaging point deviations of the off-axis rays in different heights are controlled within a range of ±0.03 mm. In FIGS. 39B and 39C illustrating the field curvature aberrations, focal length variations of the three representing wavelengths in the whole field range fall within 0.045 mm. The distortion aberration shown in FIG. 39D indicates that the distortion aberration of the ninth embodiment is maintained within a range of ±8%. Based on the above, compared with the eighth embodiment, the ninth embodiment is able to render a desirable imaging quality under a condition that the system length is reduced to about 19.976 mm.

In addition, based on the above, the longitudinal spherical aberration of the ninth embodiment is less than the longitudinal spherical aberration of the eighth embodiment.

FIG. 42 is a schematic diagram illustrating an optical imaging lens according to a tenth embodiment of the invention, and FIGS. 43A to 43D are diagrams illustrating a longitudinal spherical aberration and various aberrations of the optical imaging lens according to the tenth embodiment. Referring to FIG. 42, the tenth embodiment of the optical imaging lens 10 is similar to the first embodiment, and the differences therebetween mainly include the following: respective optical data, aspheric coefficients and parameters among the lens elements 1, 2, 3, 4, 5, 6 and 7 are different to a more or lesser extent; and the fourth lens element 4 has positive refracting power. The fifth lens element 5 has negative refracting power. To clearly illustrate the drawing, some reference numerals indicating optical axis regions and periphery regions same as those in the eighth embodiment are omitted in FIG. 42.

Detailed optical data of the optical imaging lens 10 of the tenth embodiment are as shown in FIG. 44. In addition, the EFL of the whole optical imaging lens 10 of the tenth embodiment is 4.019 mm, the HFOV thereof is 38.950°, the Fno thereof is 1.850, the system length thereof is 19.116 mm, and the image height thereof is 3.172 mm.

Respective aspheric coefficients of the object-side surface 25 of the second lens element 2 to the image-side surface 76 of the seventh lens element 7 of the tenth embodiment in Equation (1) are as shown in FIG. 45.

In addition, relations of important parameters in the optical imaging lens 10 according to the tenth embodiment are as shown in FIGS. 47 and 49.

The longitudinal spherical aberration of the tenth embodiment when the pupil radius of the tenth embodiment is 1.3023 mm is shown in FIG. 43A, and imaging point deviations of the off-axis rays in different heights are controlled within a range of ±0.024 mm. In FIGS. 43B and 43C illustrating the field curvature aberrations, focal length variations of the three representing wavelengths in the whole field range fall within ±0.048 mm. The distortion aberration shown in FIG. 43D indicates that the distortion aberration of the tenth embodiment is maintained within a range of ±2.6%. Based on the above, compared with the eighth embodiment, the tenth embodiment is able to render a desirable imaging quality under a condition that the system length is reduced to about 19.116 mm.

In addition, based on the above, the system length of the tenth embodiment is less than the system length of the eighth embodiment. The longitudinal spherical aberration of the tenth embodiment is less than the longitudinal spherical aberration of the eighth embodiment. The distortion aberration of the tenth embodiment is less than the distortion aberration of the eighth embodiment.

Referring to FIGS. 46 to 49, FIGS. 46 to 49 are tables showing the respective optical parameters from the first embodiment to the tenth embodiment.

Regarding the following conditions, at least one purpose is to maintain the EFL and the respective optical parameters at appropriate values to prevent any of the parameters from being excessively great and thus making it difficult to correct the aberrations of the whole optical imaging lens 10 or prevent any of the parameters from being excessively small and thus influencing assembling or increasing the manufacturing difficulty.

Specifically, the optical imaging lens 10 may satisfy $TTL/EFL \leq 5.300$, and more preferably may satisfy $2.500 \leq TTL/EFL \leq 5.300$;

the optical imaging lens 10 may satisfy $TL/EFL \leq 3.700$, and more preferably may satisfy $2.000 \leq TL/EFL \leq 3.700$.

Regarding the following conditions, at least one purpose is to maintain the thicknesses of and gaps between the respective lens elements at appropriate values to prevent any of the parameters from being excessively great and thus making it difficult to miniaturize the whole optical imaging lens 10 or prevent any of the parameters from being excessively small and thus influencing assembling or increasing the manufacturing difficulty.

Specifically, the optical imaging lens 10 may satisfy $ALT/(T1+T6) \leq 2.100$, and more preferably may satisfy $1.100 \leq ALT/(T1+T6) \leq 2.100$;

the optical imaging lens 10 may satisfy $ALT/(T4+T6) \leq 3.000$, and more preferably may satisfy $1.100 \leq ALT/(T4+T6) \leq 3.000$;

the optical imaging lens 10 may satisfy $AAG/(T5+G34) \leq 3.500$, and more preferably may satisfy $1.000 \leq AAG/(T5+G34) \leq 3.500$;

the optical imaging lens 10 may satisfy $(AAG+BFL)/(T4+G12) \leq 8.000$, and more preferably may satisfy $1.400 \leq (AAG+BFL)/(T4+G12) \leq 8.000$;

the optical imaging lens 10 may satisfy $TL/(T1+G45+T6) \leq 4.500$, and more preferably may satisfy $1.400 \leq TL/(T1+G45+T6) \leq 4.500$;

the optical imaging lens 10 may satisfy $TL/(T5+G56+T6) \leq 7.000$, and more preferably may satisfy $2.000 \leq TL/(T5+G56+T6) \leq 7.000$;

the optical imaging lens 10 may satisfy $(T1+T4+T5+G45)/T6 \leq 2.000$, and more preferably may satisfy $1.000 \leq (T1+T4+T5+G45)/T6 \leq 2.000$;

the optical imaging lens 10 may satisfy $(T1+T4+T5+G56)/T6 \leq 2.000$, and more preferably may satisfy $1.000 \leq (T1+T4+T5+G56)/T6 \leq 2.000$;

the optical imaging lens 10 may satisfy $(T2+G12+G23+G34)/(T4+G45) \leq 5.000$, and more preferably may satisfy $0.800 \leq (T2+G12+G23+G34)/(T4+G45) \leq 5.000$;

the optical imaging lens 10 may satisfy $(T3+G12+G23+G34)/(T4+G56) \leq 5.400$, and more preferably may satisfy $0.800 \leq (T3+G12+G23+G34)/(T4+G56) \leq 5.400$;

the optical imaging lens 10 may satisfy $(T2+G12+G23+G34)/T4 \leq 5.000$, and more preferably may satisfy $0.900 \leq (T2+G12+G23+G34)/T4 \leq 5.000$;

the optical imaging lens 10 may satisfy $(T2+T3+G12+G34)/(T4+T5) \leq 3.400$, and more preferably may satisfy $0.600 \leq (T2+T3+G12+G34)/(T4+T5) \leq 3.400$;

the optical imaging lens 10 may satisfy $(T2+T3+G23+G34)/(T4+T5) \leq 3.300$, and more preferably may satisfy $0.700 \leq (T2+T3+G23+G34)/(T4+T5) \leq 3.300$;

the optical imaging lens 10 may satisfy $(T2+T3+BFL)/(T6+G34) \leq 1.500$, and more preferably may satisfy $0.600 \leq (T2+T3+BFL)/(T6+G34) \leq 1.500$; and the optical imaging lens 10 may satisfy $(T2+T3+BFL)/T1 \leq 3.600$, and more preferably may satisfy $1.200 \leq (T2+T3+BFL)/T1 \leq 3.600$.

In addition, it is optional to select a random combination relationship of the parameter in the embodiment to increase limitation of the optical imaging lens for the ease of designing the optical imaging lens having the same structure in the invention. Due to the unpredictability in the design of an optical system, with the framework of the embodiments of the invention, under the circumstances where the above-described conditions are satisfied, the optical imaging system according to the embodiments of the invention with shorter length, improved imaging quality, or better yield rate can be preferably achieved so as to improve the shortcoming of prior art.

The above-limited relation is provided in an exemplary sense and can be randomly and selectively combined and applied to the embodiments of the invention in different manners; the invention should not be limited to the above examples. In implementation of the invention, apart from the above-described relations, it is also possible to add additional detailed structure such as more concave and convex curvatures arrangement of a specific lens element or a plurality of lens elements so as to enhance control of system property and/or resolution. For example, the periphery region of the object-side surface 35 of the third lens element 3 is convex optionally. It should be noted that the above-described details can be optionally combined and applied to the other embodiments of the invention under the condition where they are not in conflict with one another.

In view of the foregoing, the optical imaging lens 10 according to one or some exemplary embodiments of the invention is able to render one or some of the following:

i. The longitudinal spherical aberrations, the astigmatic aberrations, and the distortion aberrations of the respective embodiments of the invention meet the protocol of use. In addition, the off-axis rays of the three representing wavelengths, i.e., red, green, and blue, in different heights are all concentrated at a vicinity of the imaging point. The extents of deviation of the respective curves show that the imaging point deviations of the off-axis rays in different heights are controlled, so a desirable suppressing ability against spherical aberration, image aberration, and distortion aberration is rendered. The imaging quality data further suggest that the distances among the three representing wavelengths, i.e., red, green, and blue, are close to each other, indicating that the embodiments of the invention are able to desirably concentrate rays of different wavelengths in various states. Therefore, the embodiments of the invention exhibit an excellent chromatic dispersion suppressing ability. In view of the foregoing, by designing and matching the lens elements in the embodiments of the invention, a desirable imaging quality is rendered.

ii. The second lens element 2 has negative refracting power, which can increase the HFOV. Together with the design of configuring an optical axis region 362 of the image-side surface 36 of the third lens element 3 as a concave, the image aberration generated by the second lens element 2 may be corrected.

iii. Adhering the fourth lens element 4 and the fifth lens element 5 may facilitate the imaging quality. Specifically, the effect is desirable if a configuration of surface shapes of lens elements where the optical axis region 461 of the image-side surface 46 of the fourth lens element 4 is a convex and the optical axis region 561 of the image-side surface 56 of the fifth lens element 5 is a convex is adopted.

vi. Configuring the object-side surface 45 and the image-side surface 46 of the fourth lens element 4 and the object-side surface 55 and the image-side surface 56 of the fifth lens element 5 as aspheric surfaces and adhering together with the image-side surface 46 and the object-side surface 55 may help correct various image aberrations.

v. A ratio between a distance from the image side-surface 16 of the first lens element 1 to the object-side surface 45 of the fourth lens element 4 along the optical axis I and the thickness of the first lens element 1 along the optical axis I may be less than or equal to 3.000. When the condition is met, the thickness of the first lens element 1 may be increased, such that the first lens element 1 may not be excessively thin while the manufacturing complexity may be reduced. In addition, the optical imaging lens may not be excessively long. Together with limitations on surface shapes, the distortion aberration may be reduced. A range may be set as follows: $1.000 \leq (G12+T2+G23+T3+G34)/T1 \leq 3.000$.

vi. When the optical imaging lens 10 according to the embodiments of the invention satisfies V2>V3+V5 or V4>V3+V5, the chromatic aberration of the optical imaging lens 10 may be corrected.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical imaging lens, comprising a first lens element, a second lens element, a third lens element, a fourth lens element, a fifth lens element, and a sixth lens element arranged in sequence from an object side to an image side along an optical axis, each of the first lens element through the sixth lens element having an object-side surface facing toward the object side and allowing imaging rays to pass through as well as an image-side surface facing toward the image side and allowing the imaging rays to pass through, wherein:

the first lens element is a lens element having refracting power in a first order from the object side to the image side;

the second lens element is a lens element having refracting power in a second order from the object side to the image side and the second lens element has negative refracting power;

the third lens element is a lens element having refracting power in a third order from the object side to the image side, and an optical axis region of the image-side surface of the third lens element is a concave;

the fourth lens element is a lens element having refracting power in a third order from the image side to the object side;

the fifth lens element is a lens element having refracting power in a second order from the image side to the object side;

the sixth lens element is a lens element having refracting power in a first order from the image side to the object side, wherein there is no air gap between the image-side surface of the fourth lens element and the object-side surface of the fifth lens element, and a ratio between a distance from the image-side surface of the first lens element to the object-side surface of the fourth lens element along the optical axis and a thickness of the first lens element along the optical axis is less than or equal to 3.000.

2. The optical imaging lens as claimed in claim 1, wherein the optical imaging lens further satisfies a condition as follows: V2>V3+V5, wherein V2 is an Abbe number of the second lens element, V3 is an Abbe number of the third lens element, and V5 is an Abbe number of the fifth lens element.

3. The optical imaging lens as claimed in claim 1, wherein the optical imaging lens further satisfies a condition as follows: V4>V3+V5, wherein V4 is an Abbe number of the fourth lens element, V3 is an Abbe number of the third lens element, and V5 is an Abbe number of the fifth lens element.

4. The optical imaging lens as claimed in claim 1, wherein the optical imaging lens further satisfies a condition as follows: TTL/EFL≤5.300, wherein TTL is a distance from the object-side surface of the first lens element to an image plane along the optical axis, and EFL is an effective focal length of the optical imaging lens.

5. The optical imaging lens as claimed in claim 1, wherein the optical imaging lens further satisfies a condition as follows: TL/EFL≤3.700, wherein TL is a distance from the object-side surface of the first lens element to the image-side surface of the sixth lens element along the optical axis, and EFL is an effective focal length of the optical imaging lens.

6. The optical imaging lens as claimed in claim 1, wherein the optical imaging lens further satisfies a condition as follows: ALT/(T1+T6)≤2.100, wherein ALT is a sum of thicknesses of all the lens elements having refracting power of the optical imaging lens along the optical axis, T1 is a thickness of the first lens element along the optical axis, and T6 is a thickness of the sixth lens element along the optical axis.

7. The optical imaging lens as claimed in claim 1, wherein the optical imaging lens further satisfies a condition as follows: ALT/(T4+T6)≤3.000, wherein ALT is a sum of thicknesses of all the lens elements having refracting power of the optical imaging lens along the optical axis, T4 is a thickness of the fourth lens element along the optical axis, and T6 is a thickness of the sixth lens element along the optical axis.

8. The optical imaging lens as claimed in claim 1, wherein the optical imaging lens further satisfies a condition as follows: AAG/(T5+G34)≤1.500, wherein AAG is a sum of a distance from the image-side surface of the first lens element to the object-side surface of the second lens element along the optical axis, a distance from the image-side surface of the second lens element to the object-side surface of the third lens element along the optical axis, a distance from the image-side surface of the third lens element to the object-side surface of the fourth lens element along the optical axis, a distance from the image-side surface of the fourth lens element to the object-side surface of the fifth lens element along the optical axis, and a distance from the image-side surface of the fifth lens element to the object-side surface of the sixth lens element along the optical axis, T5 is a thickness of the fifth lens element along the optical axis, and G34 is a distance from the image-side surface of the third lens element to the object-side surface of the fourth lens element along the optical axis.

9. The optical imaging lens as claimed in claim 1, wherein the optical imaging lens further satisfies a condition as follows: $(AAG+BFL)/(T4+G12) \leq 8.000$, wherein AAG is a sum of a distance from the image-side surface of the first lens element to the object-side surface of the second lens element along the optical axis, a distance from the image-side surface of the second lens element to the object-side surface of the third lens element along the optical axis, a distance from the image-side surface of the third lens element to the object-side surface of the fourth lens element along the optical axis, a distance from the image-side surface of the fourth lens element to the object side surface of the fifth lens element along the optical axis, and a distance from the image-side surface of the fifth lens element to the object-side surface of the sixth lens element along the optical axis, BFL is a distance from the image-side surface of the sixth lens element to an image plane along the optical axis, T4 is a thickness of the fourth lens element along the optical axis, and G12 is a distance from the image-side surface of the first lens element to the object side-surface of the second lens element along the optical axis.

10. The optical imaging lens as claimed in claim 1, wherein the optical imaging lens further satisfies a condition as follows: $TL/(T1+G45+T6)$ wherein TL is a distance from the object-side surface of the first lens element to the image-side surface of the sixth lens element, T1 is a thickness of the first lens element along the optical axis, G45 is a distance from the image-side surface of the fourth lens element to the object-side surface of the fifth lens element along the optical axis, and T6 is a thickness of the sixth lens element along the optical axis.

11. The optical imaging lens as claimed in claim 1, wherein the optical imaging lens further satisfies a condition as follows: $TL/(T5+G56+T6) \leq 7.000$, wherein TL is a distance from the object-side surface of the first lens element to the image-side surface of the sixth lens element along the optical axis, T5 is a thickness of the fifth lens element along the optical axis, G56 is a distance from the image-side surface of the fifth lens element to the object-side surface of the sixth lens element along the optical axis, and T6 is a thickness of the sixth lens element along the optical axis.

12. The optical imaging lens as claimed in claim 1, wherein the optical imaging lens further satisfies a condition as follows: $(T1+T4+T5+G45)/T6 \leq 2.000$, wherein T1 is a thickness of the first lens element along the optical axis, T4 is a thickness of the fourth lens element along the optical axis, T5 is a thickness of the fifth lens element along the optical axis, G45 is a distance from the image-side surface of the fourth lens element to the object-side surface of the fifth lens element along the optical axis, and T6 is a thickness of the sixth lens element along the optical axis.

13. The optical imaging lens as claimed in claim 1, wherein the optical imaging lens further satisfies a condition as follows: $(T1+T4+T5+G56)/T6 \leq 2.000$, wherein T1 is a thickness of the first lens element along the optical axis, T4 is a thickness of the fourth lens element along the optical axis, T5 is a thickness of the fifth lens element along the optical axis, G56 is a distance from the image-side surface of the fifth lens element to the object-side surface of the sixth lens element along the optical axis, and T6 is a thickness of the sixth lens element along the optical axis.

14. The optical imaging lens as claimed in claim 1, wherein the optical imaging lens further satisfies a condition as follows: $(T2+G12+G23+G34)/(T4+G45) \leq 5.000$, wherein T2 is a thickness of the second lens element along the optical axis, G12 is a distance from the image-side surface of the first lens element to the object-side surface of the second lens element along the optical axis, G23 is a distance from the image-side surface of the second lens element to the object-side surface of the third lens element along the optical axis, G34 is a distance from the image-side surface of the third lens element to the object-side surface of the fourth lens element along the optical axis, T4 is a thickness of the fourth lens element along the optical axis, and G45 is a distance from the image-side surface of the fourth lens element to the object-side surface of the fifth lens element along the optical axis.

15. The optical imaging lens as claimed in claim 1, wherein the optical imaging lens further satisfies a condition as follows: $(T3+G12+G23+G34)/(T4+G56) \leq 5.400$, wherein T3 is a thickness of the third lens element along the optical axis, G12 is a distance from the image-side surface of the first lens element to the object-side surface of the second lens element along the optical axis, G23 is a distance from the image-side surface of the second lens element to the object-side surface of the third lens element along the optical axis, G34 is a distance from the image-side surface of the third lens element to the object-side surface of the fourth lens element along the optical axis, T4 is a thickness of the fourth lens element along the optical axis, and G56 is a distance from the image-side surface of the fifth lens element to the object-side surface of the sixth lens element along the optical axis.

16. The optical imaging lens as claimed in claim 1, wherein the optical imaging lens further satisfies a condition as follows: $(T2+G12+G23+G34)/T4 \leq 5.000$, wherein T2 is a thickness of the second lens element along the optical axis, G12 is a distance from the image-side surface of the first lens element to the object-side surface of the second lens element along the optical axis, G23 is a distance from the image-side surface of the second lens element to the object-side surface of the third lens element along the optical axis, G34 is a distance from the image-side surface of the third lens element to the object-side surface of the fourth lens element along the optical axis, and T4 is a thickness of the fourth lens element along the optical axis.

17. The optical imaging lens as claimed in claim 1, wherein the optical imaging lens further satisfies a condition as follows: $(T2+T3+G12+G34)/(T4+T5) \leq 3.400$, wherein T2 is a thickness of the second lens element along the optical axis, T3 is a thickness of the third lens element along the optical axis, G12 is a distance from the image-side surface of the first lens element to the object-side surface of the second lens element along the optical axis, G34 is a distance from the image-side surface of the third lens element to the object-side surface of the fourth lens element along the optical axis, T4 is a thickness of the fourth lens element along the optical axis, and T5 is a thickness of the fifth lens element along the optical axis.

18. The optical imaging lens as claimed in claim 1, wherein the optical imaging lens further satisfies a condition as follows: $(T2+T3+G23+G34)/(T4+T5) \leq 3.300$, wherein T2 is a thickness of the second lens element on the optical axis, T3 is a thickness of the third lens element on the optical axis, G23 is a distance from the image-side surface of the second lens element to the object-side surface of the third lens element along the optical axis, G34 is a distance from the image-side surface of the third lens element to the object-side surface of the fourth lens element along the optical axis, T4 is a thickness of the fourth lens element along the optical axis, and T5 is a thickness of the fifth lens element along the optical axis.

19. The optical imaging lens as claimed in claim 1, wherein the optical imaging lens further satisfies a condition as follows: $(T2+T3+BFL)/(T6+G34) \leq 1.500$, wherein T2 is a thickness of the second lens element along the optical axis, T3 is a thickness of the third lens element along the optical axis, BFL is a distance from the image-side surface of the sixth lens element to an image plane along the optical axis, T6 is a thickness of the sixth lens element along the optical axis, and G34 is a distance from the image-side surface of the third lens element to the object-side surface of the fourth lens element along the optical axis.

20. The optical imaging lens as claimed in claim 1, wherein the optical imaging lens satisfies a condition as follows: $(T2+T3+BFL)/T1 \leq 3.600$, wherein T2 is a thickness of the second lens element along the optical axis, T3 is a thickness of the third lens element along the optical axis, BFL is a distance from the image-side surface of the sixth lens element to an image plane along the optical axis, and T1 is a thickness of the first lens element along the optical axis.

* * * * *